United States Patent
Omer et al.

(10) Patent No.: US 12,137,396 B2
(45) Date of Patent: Nov. 5, 2024

(54) OPERATING A MOBILE WIRELESS COMMUNICATION DEVICE FOR WIRELESS MOTION SENSING

(71) Applicant: Cognitive Systems Corp., Waterloo (CA)

(72) Inventors: Mohammad Omer, Waterloo (CA); William James Halford, Waterloo (CA)

(73) Assignee: Cognitive Systems Corp., Waterloo (CA)

( * ) Notice: Subject to any disclaimer, the term of this patent is extended or adjusted under 35 U.S.C. 154(b) by 300 days.

(21) Appl. No.: 17/741,115

(22) Filed: May 10, 2022

(65) Prior Publication Data

US 2023/0370819 A1  Nov. 16, 2023

(51) Int. Cl.
*H04W 4/38* (2018.01)
*H04W 8/08* (2009.01)

(52) U.S. Cl.
CPC ............... *H04W 4/38* (2018.02); *H04W 8/08* (2013.01)

(58) Field of Classification Search
CPC ......... H04W 4/38; H04W 8/08; H04W 4/027; H04W 4/029; H04W 76/14; H04W 76/23
See application file for complete search history.

(56) References Cited

U.S. PATENT DOCUMENTS

| | | |
|---|---|---|
| 8,710,984 B2 | 4/2014 | Wilson et al. |
| 9,523,760 B1 | 12/2016 | Kravets et al. |
| 9,524,628 B1 | 12/2016 | Omer et al. |
| 9,584,974 B1 | 2/2017 | Omer et al. |

(Continued)

FOREIGN PATENT DOCUMENTS

| | | |
|---|---|---|
| WO | 2015168700 | 11/2015 |
| WO | 2017106976 | 6/2017 |

(Continued)

OTHER PUBLICATIONS

Ma, et al., "WiFi Sensing with Channel State Information: A Survey", ACM Comput. Surv., vol. 52, No. 3, Article 46, Jun. 2019, 36 pgs.

Zhang, et al., "Enabling Joint Communication and Radar Sensing in Mobile Networks—A Survey", arXiv:2006.07559v3, Jan. 16, 2021, 32 pgs.

WIPO, International Search Report and Written Opinion issued in Application No. PCT/CA2023/050534 on Jul. 11, 2023, 11 pages.

*Primary Examiner* — Dinh Nguyen

(74) *Attorney, Agent, or Firm* — Henry Patent Law Firm PLLC

(57) ABSTRACT

In a general aspect, a mobile wireless communication device is operated for motion sensing. In some aspects, wireless signals transmitted from a second wireless communication device through a space during a time period are received at a first wireless communication device. By operation of the first wireless communication device, channel state information is generated based on the wireless signals. Whether the first wireless communication device moved during the time period is detected. In response to detecting that the first wireless communication device moved relative to the second wireless communication device during the time period, motion sensing parameters of a motion sensing system are updated. The channel state information is processed according to the updated motion sensing parameters to detect motion of an object—other than the first wireless communication device—in the space during the time period.

20 Claims, 10 Drawing Sheets

(56) References Cited

U.S. PATENT DOCUMENTS

| | | | |
|---|---|---|---|
| 9,869,759 B2 | 1/2018 | Furuskog et al. | |
| 9,927,519 B1 | 3/2018 | Omer et al. | |
| 10,004,076 B1 | 6/2018 | Griesdorf et al. | |
| 10,048,350 B1 | 8/2018 | Piao et al. | |
| 10,051,414 B1* | 8/2018 | Omer | G01S 13/56 |
| 10,108,903 B1 | 10/2018 | Piao et al. | |
| 10,109,167 B1* | 10/2018 | Olekas | G08B 13/2491 |
| 10,109,168 B1 | 10/2018 | Devison et al. | |
| 10,111,228 B2 | 10/2018 | Griesdorf et al. | |
| 10,129,853 B2 | 11/2018 | Manku et al. | |
| 10,228,439 B1 | 3/2019 | Olekas et al. | |
| 10,264,405 B1 | 4/2019 | Manku et al. | |
| 10,318,890 B1 | 6/2019 | Kravets et al. | |
| 10,380,856 B2 | 8/2019 | Devison et al. | |
| 10,393,866 B1 | 8/2019 | Kravets et al. | |
| 10,404,387 B1* | 9/2019 | Devison | H04B 17/309 |
| 10,438,468 B2 | 10/2019 | Olekas et al. | |
| 10,459,074 B1 | 10/2019 | Omer et al. | |
| 10,459,076 B2 | 10/2019 | Kravets et al. | |
| 10,460,581 B1 | 10/2019 | Devison et al. | |
| 10,498,467 B1 | 12/2019 | Ravkine | |
| 10,499,364 B1 | 12/2019 | Ravkine | |
| 10,506,384 B1* | 12/2019 | Omer | H04W 4/029 |
| 10,565,860 B1 | 2/2020 | Omer et al. | |
| 10,567,914 B1* | 2/2020 | Omer | H04W 4/023 |
| 10,600,314 B1 | 3/2020 | Manku et al. | |
| 10,605,907 B2 | 3/2020 | Kravets et al. | |
| 10,605,908 B2 | 3/2020 | Kravets et al. | |
| 10,743,143 B1 | 8/2020 | Devison et al. | |
| 10,798,529 B1 | 10/2020 | Beg et al. | |
| 10,849,006 B1 | 11/2020 | Beg et al. | |
| 10,924,889 B1* | 2/2021 | Omer | H04W 64/006 |
| 11,006,245 B2 | 5/2021 | Omer | |
| 11,012,122 B1 | 5/2021 | Beg et al. | |
| 11,018,734 B1 | 5/2021 | Beg | |
| 11,070,399 B1 | 7/2021 | Omer et al. | |
| 11,087,604 B2 | 8/2021 | Beg et al. | |
| 2012/0146788 A1 | 6/2012 | Wilson et al. | |
| 2014/0247179 A1 | 9/2014 | Furuskog | |
| 2017/0359804 A1 | 12/2017 | Manku et al. | |
| 2018/0270821 A1 | 9/2018 | Griesdorf et al. | |
| 2019/0122514 A1 | 4/2019 | Olekas et al. | |
| 2019/0146075 A1 | 5/2019 | Kravets et al. | |
| 2019/0146076 A1 | 5/2019 | Kravets et al. | |
| 2019/0146077 A1* | 5/2019 | Kravets | G08B 13/187 |
| | | | 455/67.11 |
| 2019/0147713 A1 | 5/2019 | Devison et al. | |
| 2019/0170869 A1 | 6/2019 | Kravets et al. | |
| 2019/0271775 A1* | 9/2019 | Zhang | G01S 13/003 |
| 2019/0384409 A1 | 12/2019 | Omer et al. | |
| 2020/0175405 A1* | 6/2020 | Omer | G06N 7/01 |
| 2020/0178033 A1 | 6/2020 | Omer et al. | |
| 2020/0264292 A1 | 8/2020 | Kravets et al. | |
| 2020/0319324 A1 | 10/2020 | Chi-Lim et al. | |
| 2020/0351576 A1* | 11/2020 | Beg | H04Q 9/00 |
| 2020/0351692 A1 | 11/2020 | Beg et al. | |

FOREIGN PATENT DOCUMENTS

| | | |
|---|---|---|
| WO | 2017132765 | 8/2017 |
| WO | 2017210770 | 12/2017 |
| WO | 2018094502 | 5/2018 |

* cited by examiner

OPERATING A MOBILE WIRELESS COMMUNICATION DEVICE FOR WIRELESS MOTION SENSING

BACKGROUND

The following description relates to operating a mobile wireless communication device for wireless motion sensing.

Motion sensing systems have been used to detect movement, for example, of objects in a room or an outdoor area. In some example motion sensing systems, infrared or optical sensors are used to detect movement of objects in the sensor's field of view. Motion sensing systems have been used in security systems, automated control systems, and other types of systems.

DETAILED DESCRIPTION

Figure 1:
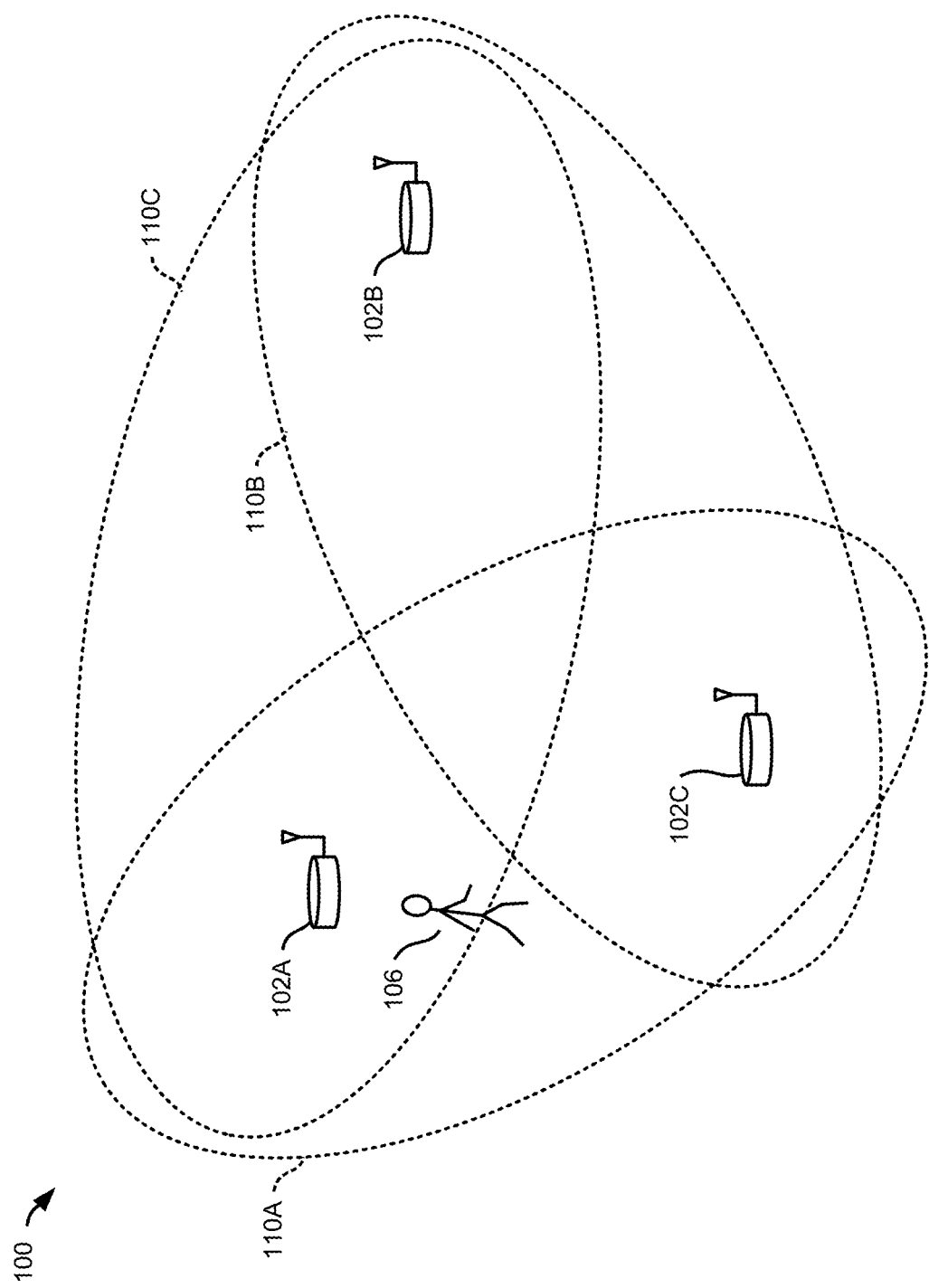
FIG. 1 is a block diagram showing an example wireless communication system.

In some aspects of what is described here, a motion sensing system includes a mobile wireless communication device. The mobile wireless communication device communicates wireless signals with other wireless communication devices in the motion sensing system to detect motion of an object in a space. The mobile wireless communication device can move in the space relative to other wireless communication devices of the motion sensing system. When movement of the mobile wireless communication device relative to at least one other wireless communication device is detected during a time period, the motion sensing parameters of the motion sensing system can be updated for detecting motion of another object (i.e., an object other than the mobile wireless communication device) that occurred during the time period.

In some instances, aspects of the systems and techniques described here provide technical improvements and advantages over existing approaches. For example, the methods and techniques presented here can enable or expand the use of mobile wireless communication devices for motion sensing and improve motion sensing performance (e.g., accuracy) of a motion sensing system. For example, the false positive rate of a motion sensing system can be reduced by filtering out the effect caused by motion of one or more wireless communication devices of a motion sensing system.

In some implementations, a motion sensing system can be used for wireless sensing applications by processing wireless signals (e.g., radio frequency signals) transmitted through a space between wireless communication devices. Example wireless sensing applications include motion detection, which can include one or more of the following: detecting motion of objects in the space, motion tracking, motion localization, breathing detection, breathing monitoring, presence detection, gesture detection, gesture recognition, human detection (e.g., moving and stationary human detection), human tracking, fall detection, speed estimation, intrusion detection, walking detection, step counting, respiration rate detection, apnea estimation, posture change detection, activity recognition, gait rate classification, gesture decoding, sign language recognition, hand tracking, heart rate estimation, breathing rate estimation, room occupancy detection, human dynamics monitoring, and other types of motion detection applications. Other examples of wireless sensing applications include object recognition, speaking recognition, keystroke detection and recognition, tamper detection, touch detection, attack detection, user authentication, driver fatigue detection, traffic monitoring, smoking detection, school violence detection, human counting, metal detection, human recognition, bike localization, human queue estimation, Wi-Fi imaging, and other types of wireless sensing applications. For instance, the motion sensing system may operate as a motion sensing system to detect the existence and location of motion based on Wi-Fi signals or other types of wireless signals.

The examples described above may be useful for home monitoring. Home monitoring using the motion sensing systems described herein provides several advantages, including full home coverage through walls and darkness, discreet detection without cameras, higher accuracy and reduced false alerts (e.g., in comparison with sensors that do not use Wi-Fi signals to sense their environments), and adjustable sensitivity. By layering Wi-Fi motion detection capabilities into routers and gateways, a robust motion sensing system may be provided.

The examples described above may also be useful in wellness monitoring. Caregivers want to know their loved ones are safe, while seniors and people with special needs want to maintain their independence at home with dignity. Wellness monitoring using the motion sensing systems described herein provides a solution that uses wireless signals to detect motion without using cameras or infringing on privacy, generate alerts when unusual activity is detected, track sleep patterns, and generate preventative health data. For example, caregivers can monitor motion, visits from health care professionals, and unusual behavior such as staying in bed longer than normal. Furthermore, motion is monitored unobtrusively without the need for wearable devices, and the motion sensing systems described herein can offer a more affordable and convenient alternative to assisted living facilities and other security and health monitoring tools.

The examples described above may also be useful in setting up a smart home. In some examples, the motion sensing systems described herein use predictive analytics and artificial intelligence (AI), to learn movement patterns and trigger smart home functions accordingly. Examples of smart home functions that may be triggered include adjusting the thermostat when a person walks through the front door, turning other smart devices on or off based on preferences, automatically adjusting lighting, adjusting HVAC systems based on present occupants, etc.

In some aspects of what is described here, wireless signals transmitted on wireless communication links are analyzed to determine channel state information, which can be used for wireless motion sensing. The channel state information may be representative of a physical medium that applies a transfer function to wireless signals that traverse a space. In some instances, the channel state information includes a channel response. Channel responses can characterize a physical communication path, representing the combined effect of, for example, scattering, fading, and power decay within the space between the transmitter and receiver. In some instances, the channel state information includes beamforming state information (e.g., a feedback matrix, a steering matrix, channel state information (CSI), etc.) provided by a beamforming system. Beamforming is a signal processing technique often used in multi antenna (multiple-input/multiple-output (MIMO)) radio systems for directional signal transmission or reception. Beamforming can be achieved by operating elements in an antenna array in such a way that signals at particular angles experience constructive interference, while others experience destructive interference. The channel state information of a wireless communication link may be analyzed (e.g., by an access point or other device in a wireless communication network, or a remote device that receives information from the network) to detect, for example, whether motion has occurred in the space, to determine a relative location of the detected motion, or both. In some aspects, the channel state information for each of the wireless communication links may be analyzed to detect whether an object is present or absent, e.g., when no motion is detected in the space.

Example motion detection and localization algorithms that can be used to detect motion based on wireless signals include the techniques described in U.S. Pat. No. 9,523,760 entitled "Detecting Motion Based on Repeated Wireless Transmissions," U.S. Pat. No. 9,584,974 entitled "Detecting Motion Based on Reference Signal Transmissions," U.S. Pat. No. 10,051,414 entitled "Detecting Motion Based On Decompositions Of Channel Response Variations," U.S. Pat. No. 10,048,350 entitled "Motion Detection Based on Groupings of Statistical Parameters of Wireless Signals," U.S. Pat. No. 10,108,903 entitled "Motion Detection Based on Machine Learning of Wireless Signal Properties," U.S. Pat. No. 10,109,167 entitled "Motion Localization in a Wireless Mesh Network Based on Motion Indicator Values," U.S. Pat. No. 10,109,168 entitled "Motion Localization Based on Channel Response Characteristics," U.S. Pat. No. 10,743,143 entitled "Determining a Motion Zone for a Location of Motion Detected by Wireless Signals," U.S. Pat. No. 10,605,908 entitled "Motion Detection Based on Beamforming Dynamic Information from Wireless Standard Client Devices," U.S. Pat. No. 10,605,907 entitled "Motion Detection by a Central Controller Using Beamforming Dynamic Information," U.S. Pat. No. 10,600,314 entitled "Modifying Sensitivity Settings in a Motion sensing system," U.S. Pat. No. 10,567,914 entitled "Initializing Probability Vectors for Determining a Location of Motion Detected from Wireless Signals," U.S. Pat. No. 10,565,860 entitled "Offline Tuning System for Detecting New Motion Zones in a Motion Sensing System," U.S. Pat. No. 10,506,384 entitled "Determining a Location of Motion Detected from Wireless Signals Based on Prior Probability," U.S. Pat. No. 10,499,364 entitled "Identifying Static Leaf Nodes in a Motion sensing system," U.S. Pat. No. 10,498,467 entitled "Classifying Static Leaf Nodes in a Motion sensing system," U.S. Pat. No. 10,460,581 entitled "Determining a Confidence for a Motion Zone Identified as a Location of Motion for Motion Detected by Wireless Signals," U.S. Pat. No. 10,459,076 entitled "Motion Detection based on Beamforming Dynamic Information," U.S. Pat. No. 10,459,074 entitled "Determining a Location of Motion Detected from Wireless Signals Based on Wireless Link Counting," U.S. Pat. No. 10,438,468 entitled "Motion Localization in a Wireless Mesh Network Based on Motion Indicator Values," U.S. Pat. No. 10,404,387 entitled "Determining Motion Zones in a Space Traversed by Wireless Signals," U.S. Pat. No. 10,393,866 entitled "Detecting Presence Based on Wireless Signal Analysis," U.S. Pat. No. 10,380,856 entitled "Motion Localization Based on Channel Response Characteristics," U.S. Pat. No. 10,318,890 entitled "Training Data for a Motion sensing system using Data from a Sensor Device," U.S. Pat. No. 10,264,405 entitled "Motion Detection in Mesh Networks," U.S. Pat. No. 10,228,439 entitled "Motion Detection Based on Filtered Statistical Parameters of Wireless Signals," U.S. Pat. No. 10,129,853 entitled "Operating a Motion Detection Channel in a Wireless Communication Network," U.S. Pat. No. 10,111,228 entitled "Selecting Wireless Communication Channels Based on Signal Quality Metrics," and other techniques.

FIG. 1 is a block diagram showing an example wireless communication system 100. The example wireless communication system 100 includes three wireless communication devices 102A, 102B, 102C. The example wireless communication system 100 may include additional wireless communication devices 102 and/or other components (e.g., one or more network servers, network routers, network switches, cables, or other communication links, etc.).

The example wireless communication devices 102A, 102B, 102C operate in a wireless communication network, for example, according to a wireless communication network standard or another type of wireless communication protocol. For example, the wireless communication network may be configured to operate as a Wireless Local Area Network (WLAN), a Personal Area Network (PAN), a metropolitan area network (MAN), or another type of wireless communication network. Examples of WLANs include networks configured to operate according to one or more of the 802.11 family of standards developed by IEEE (e.g., Wi-Fi networks), and others. Examples of PANs include networks that operate according to short-range communication standards (e.g., BLUETOOTH®, Near Field Communication (NFC), ZigBee), millimeter wave communications, and others.

In some implementations, the wireless communication devices 102A, 102B, 102C may be configured to communicate in a cellular network, for example, according to a cellular network standard. Examples of cellular networks include networks configured according to 2G standards such as Global System for Mobile (GSM) and Enhanced Data rates for GSM Evolution (EDGE) or EGPRS; 3G standards such as Code Division Multiple Access (CDMA), Wideband Code Division Multiple Access (WCDMA), Universal Mobile Telecommunications System (UMTS), and Time Division Synchronous Code Division Multiple Access (TD-SCDMA); 4G standards such as Long-Term Evolution (LTE) and LTE-Advanced (LTE-A); 5G standards, and others.

In some cases, one or more of the wireless communication devices 102 is a Wi-Fi access point device or another type of wireless access point (WAP) device. In some cases, one or more of the wireless communication devices 102 is an access point device of a multiple-access point (multi-AP) wireless communication network, such as, for example, a commercially available mesh network system. In some instances, one or more of the wireless communication devices 102 can be implemented as wireless access point (AP) devices in a mesh network, while the other wireless communication device(s) 102 are implemented as client station (STA) devices (e.g., mobile devices, smart devices, etc.) that access the mesh network through one of the AP devices. In some cases, one or more of the wireless communication devices 102 is a mobile device (e.g., a smartphone, a smart watch, a tablet, a laptop computer, etc.), a wireless-enabled device (e.g., a smart thermostat, a Wi-Fi enabled camera, a smart TV, etc.), or another type of device that communicates in a wireless communication network.

In the example shown in FIG. 1, the wireless communication devices 102 transmit wireless signals to each other over wireless communication links (e.g., according to a wireless communication network standard or a non-standard wireless communication protocol), and the wireless signals communicated between the wireless communication devices can be used as motion probe signals to detect motion of objects in the signal paths between the wireless communication devices. In some implementations, standard signals (e.g., channel sounding signals, beacon signals, or other standard signals), non-standard reference signals, or other types of wireless signals can be used as motion probe signals. In some implementations, the wireless communication system 100 is configured for motion sensing. In this case, the wireless communication devices 102 of the wireless communication system 100 form a motion sensing system.

In the example shown in FIG. 1, the wireless communication link between the wireless communication devices 102A, 102C can be used to probe a first motion detection zone 110A, the wireless communication link between the wireless communication devices 102B, 102C can be used to probe a second motion detection zone 110B, and the wireless communication link between the wireless communication device 102A, 102B can be used to probe a third motion detection zone 110C. In some instances, the motion detection zones 110 can include, for example, air, solid materials, liquids, or other mediums through which wireless electromagnetic signals may propagate.

In the example shown in FIG. 1, when an object moves in any of the motion detection zones 110, the motion sensing system may detect the motion based on wireless signals transmitted through the relevant motion detection zone 110. Generally, the object can be any type of static or moveable object, and can be living or inanimate. For example, the object can be a human (e.g., the person 106 shown in FIG. 1), an animal, an inorganic object, or another device, apparatus, or assembly, an object that defines all or part of the boundary of a space (e.g., a wall, door, window, etc.), or another type of object.

In some examples, the wireless signals may propagate through a structure (e.g., a wall) before or after interacting with a moving object, which may allow the moving object's movement to be detected without an optical line-of-sight between the moving object and the transmitting or receiving wireless communication devices 102. In some implementations, the motion sensing system may communicate motion data to another device or system, such as a security system, a control center, or a cloud-based computer system, for cloud-based services, such as data storage and data processing.

In some implementations, the wireless communication devices 102 are configured to perform one or more operations of the motion sensing system, for example, by executing computer-readable instructions (e.g., software or firmware) on the wireless communication devices 102. For example, each wireless communication device 102 may process received wireless signals to detect motion based on changes in the channel state information. In an example aspect of operation, the wireless communication devices 102A, 102B may broadcast wireless signals or address wireless signals to the other wireless communication device 102C, and the wireless communication device 102C (and potentially other devices) receives the wireless signals transmitted by the wireless communication devices 102A, 102B. The wireless communication device 102C (or another system or device) then processes the received wireless signals to detect motion of an object in a space accessed by the wireless signals (e.g., in the zones 110A, 11B). In some instances, the wireless communication device 102C (or another system or device) may perform one or more operations of the motion sensing system. In some cases, another device (e.g., a remote server, a cloud-based computer system, a network-attached device, etc.) is configured to perform one or more operations of the motion sensing system. For example, one of the wireless communication devices 102 (e.g., a central AP device that connects to a wired LAN) may receive channel state information (CSI) data from associated wireless communication devices 102 and send the CSI data to a specified device, system, or service that processes the received CSI data to detect motion.

Figure 2A:
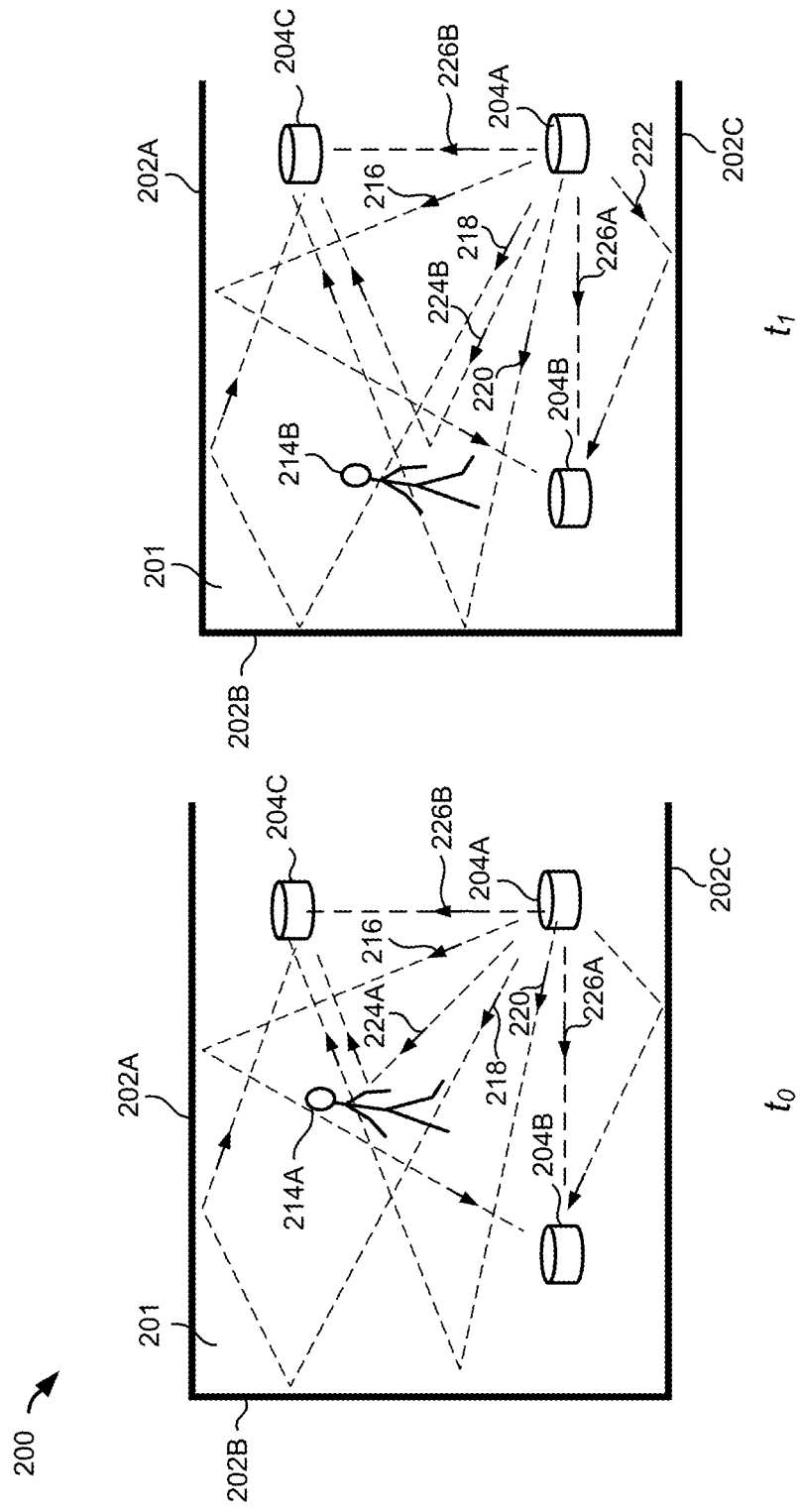
FIG. 2A is a block diagram showing aspects of an example motion sensing system.

FIG. 2A is a block diagram showing aspects of an example motion sensing system 200. As shown in FIG. 2A, the motion sensing system 200 is deployed to detect motion of an object in a space 201 based on wireless signals communicated between wireless communication devices 204A, 204B, 204C. In some implementations, the wireless communication devices 204A, 204B, 204C may be, for example, the wireless communication devices 102A, 102B, 102C shown in FIG. 1, or may be other types of wireless communication devices. The space 201 may be completely or partially enclosed or open at one or more boundaries of the space 201. In some instances, the space 201 may be, or may include, an interior of a room, multiple rooms, a building, an indoor area, an outdoor area, or other types of spaces. As shown in FIG. 2A, a first wall 202A, a second wall 202B, and a third wall 202C at least partially enclose the space 201.

In some cases, a combination of one or more of the wireless communication devices 204A, 204B, 204C can be part of, or may be used in a wireless communication system in the space 201. For example, the wireless communication devices 204A, 204B, 204C can form a wireless communication network and transmit wireless signals for wireless communication purposes through the space 201, operating under a wireless communication standard. The wireless communication topology of a wireless communication system may include a set of wireless communication links between the wireless communication devices 204A, 204B, 204C. The wireless communication topology can be used as a motion sensing topology of the motion sensing system 200 for motion sensing purposes through the space 201. In some implementations, the motion sensing topology may include a subset of the wireless communication devices 204A, 204B, 204C or a subset of the wireless communication links between the wireless communication devices 204A, 204B, 204C.

In the example shown in FIG. 2A, the first wireless communication device 204A transmits wireless signals repeatedly (e.g., periodically, intermittently, at scheduled, unscheduled, or random intervals, etc.). The second and third wireless communication devices 204B, 204C receive the wireless signals transmitted by the wireless communication device 204A.

As shown, an object is in a first position 214A at an initial time step ($t_0$) and the object has moved to a second position 214B at a subsequent time step ($t_1$). In FIG. 2A, the moving object in the space 201 is represented as a human or implemented as the object 106 in FIG. 1. In the example shown in FIG. 2A, the wireless communication devices 204A, 204B, 204C remain stationary relative to one another and relative to the space 201; and are, consequently, at the same position in the space 201 at the initial time step $t_0$ and at the subsequent time step $t_1$.

As shown in FIG. 2A, signal paths of the wireless signals transmitted from the first wireless communication device 204A are illustrated by dashed lines. Along a first signal path 216, the wireless signal is transmitted from the first wireless communication device 204A and reflected off the first wall 202A toward the second wireless communication device 204B. Along a second signal path 218, the wireless signal is transmitted from the first wireless communication device 204A and reflected off the second wall 202B and the first wall 202A toward the third wireless communication device 204C. Along a third signal path 220, the wireless signal is transmitted from the first wireless communication device 204A and reflected off the second wall 202B toward the third wireless communication device 204C. Along a fourth signal path 222, the wireless signal is transmitted from the first wireless communication device 204A and reflected off the third wall 202C toward the second wireless communication device 204B.

At the initial time step $t_0$, along a fifth signal path 224A, the wireless signal is transmitted from the first wireless communication device 204A and reflected off the object at the first position 214A toward the third wireless communication device 204C. Between the initial time step $t_0$ and the subsequent time step $t_1$, the object moves from the first position 214A to a second position 214B in the space 201 (e.g., some distance away from the first position 214A). At the subsequent time step $t_1$, along a sixth signal path 224B, the wireless signal is transmitted from the first wireless communication device 204A and reflected off the object at the second position 214B toward the third wireless communication device 204C. The sixth signal path 224B at the subsequent time step $t_1$ is longer than the fifth signal path 224A at the initial time step $t_0$ due to the movement of the object from the first position 214A to the second position 214B. In some examples, a signal path can be added, removed, or otherwise modified due to movement of the object or another object in the space 201.

In some implementations, the wireless signals communicated in the motion sensing system 200 shown in FIG. 2A, when propagating through their respective signal paths, experience attenuation, frequency shifts, interference, phase shifts, or other effects and may have portions that propagate in another direction, for example, through the walls 202A, 202B, and 202C. In some examples, the wireless signals are radio frequency (RF) signals or other types of signals.

In some implementations, each of the wireless signals communicated in the motion sensing system 200 shown in FIG. 2A may have a number of frequency components in a frequency bandwidth, or may include one or more bands within the frequency bandwidth. The wireless signals communicated in the motion sensing system 200 shown in FIG. 2A may be transmitted from a wireless communication device 204 in an omnidirectional manner, in a directional manner, or otherwise. In the example shown, the wireless signal transmitted by the first wireless communication device 204A traverses multiple respective signal paths in the space 201. In some cases, the wireless signal along a signal path may become attenuated due to path losses, scattering, reflection, absorption, or the like and may have a phase or frequency offset.

As shown in FIG. 2A, a first wireless communication link between the first and second wireless communication devices 204A, 204B includes three signal paths, e.g., a direct signal path 226A and two indirect signal paths 216 and 222. Similarly, at the initial time step $t_0$, a second wireless communication link between the first and third wireless communication devices 204A, 204C includes one direct signal path 226B and three indirect signal paths 218, 220, and 224A. As shown in FIG. 2A, at the initial time step $t_0$, the wireless signals along the signal paths 216, 222 and 226A combine at the second wireless communication device 204B and the wireless signals along the signal paths 218, 220, 224A, and 226B combine at the third wireless communication device 204C to form received signals.

At the subsequent time step $t_1$, the second wireless communication link includes one direct signal path 226B and three indirect signal paths 218, 220, and 224B. In certain instances, the first and second wireless communication links at different time steps may include more signal paths or different signal paths caused by another physical object or medium (e.g., part of a structure, furniture, a living object, etc.) that scatters radio frequency signals in the space 201. Wireless signals along the first and second wireless communication links at different time steps traverse on the respective signal paths.

Because of the effects of the multiple signal paths in the space 201 on the wireless signals, the space 201 can be represented as a filter with a transfer function in which the wireless signals are the input and the received signals are output. When an object moves in the space 201, the attenuation or phase offset applied to a wireless signal along a signal path can change, and hence, the transfer function (e.g., the channel response) of the space 201 can change. When the same wireless signal is transmitted from the first wireless communication device 204A, if the transfer function of the space 201 changes, the output of that transfer function, e.g., the received signal, can also change. A change in the received signal can be used to detect movement of an object. As shown in FIG. 2A, the wireless signals along the signal paths 218, 220, 224B, and 226B combine at the third wireless communication device 204C to form the received signals at the subsequent time step $t_1$. Conversely, in some cases, if the transfer function of the space does not change, the output of the transfer function—the received signal—may not change.

Mathematically, a wireless signal f(t) transmitted from a wireless communication device (e.g., the first wireless communication device 204A) may be described according to Equation (1):

$$f(t) = \sum_{n=-\infty}^{\infty} c_n e^{j\omega_n t} \quad (1)$$

where $\omega_n$ represents the frequency of $n^{th}$ frequency component of the wireless signal, $c_n$ represents the complex coefficient of the $n^{th}$ frequency component, and t represents time. With the wireless signal f(t) being transmitted from the first wireless communication device 204A, an output signal $r_k(t)$ from a signal path k may be described according to Equation (2):

$$r_k(t) = \sum_{n=-\infty}^{\infty} \alpha_{n,k} c_n e^{j(\omega_n t + \phi_{n,k})} \qquad (2)$$

where $\alpha_{n,k}$ represents the attenuation factor (e.g., due to scattering, reflection, and path losses) for the $n^{th}$ frequency component along signal path k, and $\phi_{n,k}$ represents the phase of the wireless signal for $n^{th}$ frequency component along signal path k. Then, the received signal R at a receiving wireless communication device (e.g., the second or third wireless communication devices 204B or 204C) can be described as the summation of all output signals $r_k(t)$ from all signal paths to the receiving wireless communication device, which is shown in Equation (3):

$$R = \sum_k r_k(t) \qquad (3)$$

Substituting Equation (2) into Equation (3) renders the following Equation (4):

$$R = \sum_k \sum_{n=-\infty}^{\infty} \left(\alpha_{n,k} e^{j\phi_{n,k}}\right) c_n e^{j\omega_n t} \qquad (4)$$

The received signal R at a wireless communication device can then be analyzed, for example, to detect motion. The received signal R at a wireless communication device can be transformed to the frequency domain, for example, using a Fast Fourier Transform (FFT) or another type of algorithm. The transformed signal can represent the received signal R as a series of n complex values, one for each of the respective frequency components (at then frequencies $\omega_n$). For an n-th frequency component at a frequency $\omega_n$, a complex value $Y_n$ may be represented as follows in Equation (5):

$$Y_n = \sum_k c_n \alpha_{n,k} e^{j\phi_{n,k}} \qquad (5)$$

where the complex value $Y_n$ for the n-th frequency component at the frequency $\omega_n$ indicates a relative magnitude and phase offset of the received signal at the n-th frequency component. When an object moves in the space, the complex value $Y_n$ changes due to the change in the channel response of the space. The values of the attenuation factor $\alpha_{n,k}$ and the phase $\phi_{n,k}$ are determined by physical characteristics of the environment, for example, free space propagation and the type of scattering objects present. In some examples, increasing attenuation along a signal path (e.g., by an absorbing medium like a human body or otherwise) may generally decrease the magnitude of the attenuation factor $\alpha_{n,k}$ and delay the phase $\phi_{n,k}$. Similarly, a human body or another medium acting as a scatterer can change the attenuation factor $\alpha_{n,k}$ and the phase $\phi_{n,k}$. Accordingly, a change detected in the channel response (and thus, the complex value $Y_n$) can be indicative of movement of an object within the communication channel. Conversely, a stable channel attenuation factor $\alpha_{n,k}$ and the phase $\phi_{n,k}$ may indicate lack of motion. Thus, in some implementations, the complex values $Y_n$ for each of the wireless communication devices 204 in the motion sensing system 200 can be processed to detect whether motion has occurred in the space 201 traversed by the transmitted signals f (t).

In some implementations, each of the wireless signals that is transmitted in the space 201 may be an orthogonal frequency division multiplexing (OFDM) signal, which can include, for example, a PHY frame. The PHY frame can, in some instances, include one or more Legacy PHY fields (e.g., L-LTF and L-STF), one or more MIMO training fields (e.g., HE-LTF, VHT-LTF, and HT-LTF), or both. In some implementations, the fields in the PHY frames of the wireless signals can be used to obtain frequency-domain channel responses or channel state information (CSI) data. CSI data can capture key information about how wireless signals propagate between wireless communication devices; and CSI data are sensitive to changes in the space including human motion and activities. In some instances, the fields in the PHY frames of the wireless signals can be used to obtain a set of frequency-domain channel responses $\{H_1(f), H_2(f), \ldots, H_n(f)\}$. Each frequency-domain channel response $H_i(f)$ in the set of frequency-domain channel responses $\{H_1(f), H_2(f), \ldots, H_n(f)\}$ may correspond to a respective wireless signal. In some implementations, a transformation process, for example an inverse Fourier Transform, can be performed on the frequency-domain channel response to determine a time-domain channel response or time-domain impulse response.

In another aspect of FIG. 2A, beamforming may be performed between the wireless communication devices 204 based on some knowledge of the wireless communication link or channel (e.g., through feedback properties generated by a receiver device), which can be used to generate one or more steering properties (e.g., a steering matrix) that are applied by a transmitter device to shape the transmitted beam/signal in a particular direction or directions. In some instances, changes to the steering or feedback properties used in the beamforming process indicate changes, which may be caused by moving objects in the space traversed by the wireless signals. For example, motion may be detected by identifying substantial changes in the wireless communication channel, e.g. as indicated by a channel response, or steering or feedback properties, or any combination thereof, over a period of time.

In some implementations, a steering matrix may be generated at a transmitter device (e.g., a beamformer) based on a feedback matrix provided by a receiver device (e.g., beamformee) based on channel sounding. Because the steering and feedback matrices are related to propagation characteristics of the wireless communication channel, these matrices change as objects move within the wireless communication channel. Changes in the channel characteristics are accordingly reflected in these matrices, and by analyzing the matrices, motion can be detected, and different characteristics of the detected motion (e.g., direction, type, speed, magnitude, etc.) can be determined. In some implementations, a spatial map is generated based on one or more beamforming matrices. The spatial map may indicate a general direction of an object in a space relative to a wireless communication device. In some cases, "modes" of a beamforming matrix (e.g., a feedback matrix or steering matrix)

can be used to generate the spatial map. In some instances, a spatial map can be used to detect the presence of motion in the space, to detect a location of the detected motion, or to indicate characteristics of the detected motion.

Figure 2B:
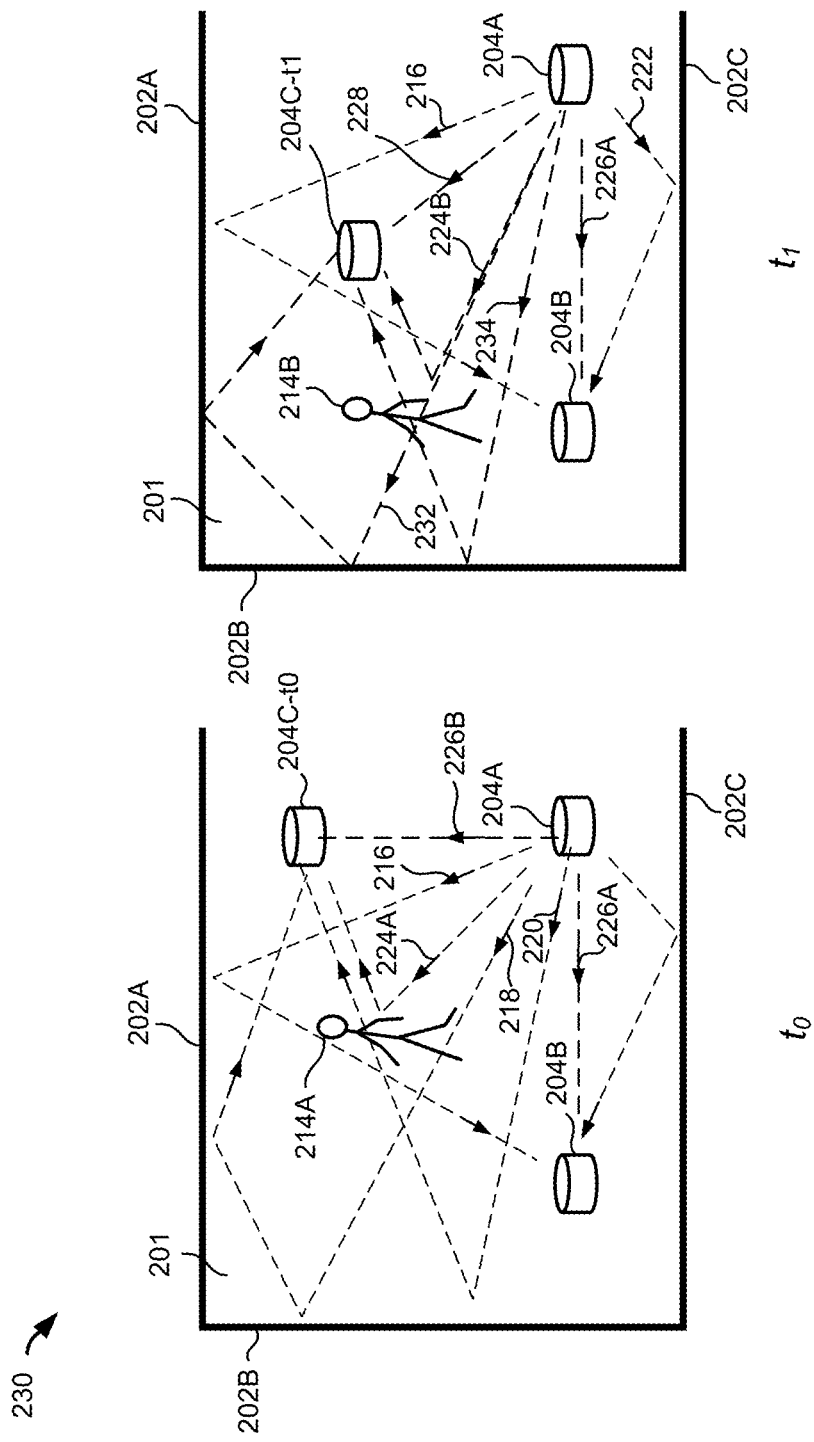
FIG. 2B is a block diagram showing aspects of an example motion sensing system.

FIG. 2B is a block diagram showing aspects of an example motion sensing system 230. The example motion sensing system 230 can be implemented as the motion sensing system 200 shown in FIG. 2A. Between the initial time step $t_0$ and the subsequent time step $t_1$ shown in FIG. 2B, the third wireless communication device 204C moves from the first position 204C-t0 to the second position 204C-t1, while the first and second wireless communication devices 204A, 204B remain stationary in the space 201 during the time period. In other words, the third wireless communication device 204C has moved during the time period relative to the first and second wireless communication devices 204A, 204B.

At the subsequent time step $t_1$, along a sixth signal path 224B, the wireless signal is transmitted from the first wireless communication device 204A and reflected off the object at the second position 214B toward the third wireless communication device 204C at the second position 204C-t1. The sixth signal path 224B at the subsequent time step $t_1$ may be longer or shorter than, or equal to the fifth signal path 224A at the initial time step $t_0$ due to the movement of the object from the first position 214A to the second position 214B and the third wireless communication device 204C from the first position 204C-t0 to the second position 204C-t1. A seventh signal path 234 at the subsequent time step $t_1$ is shorter than the third signal path 220 at the initial time step $t_0$ due to the movement of the third wireless communication device 204C from the first position 204C-t0 to the second position 204C-t1.

Furthermore, the second signal path 218 is no longer receivable by the third wireless communication device 204C at the second position 204C-t1 and a new signal path (e.g., an eighth signal path 232) is established between the first wireless communication device 204A and the third wireless communication device 204C at the subsequent time step $t_1$. In some instances, the third wireless communication device 204C may move along a different direction which may result in other changes to the signal paths. Generally, the third wireless communication device 204C and the object can move independently of each other during the time period. For instance, their respective movements can be uncorrelated in space, uncorrelated in time, or both. In some cases, the third wireless communication device 204C may begin moving before or after the initial time step $t_0$; and may stop moving before or after the subsequent time step $t_1$. In some cases, the trajectory of the motion of the wireless communication device 204C is linear, random, or varied during the initial and subsequent time steps. In some examples, one or more signal paths can be added, removed, or otherwise modified due to movement of the object, the movement of the wireless communication devices, or another object in the space 201.

In some implementations, the motion sensing system 230 specifies motion sensing parameters for each of the wireless communication links. The motion sensing parameters may be configured, for instance, when the motion sensing system 230 is initialized, and reconfigured, for instance, at various times after the motion sensing system 230 is initialized. In some implementations, the motion sensing parameters for a wireless communication link include a sampling parameters, e.g., a sampling rate and a sampling duration. In some implementations, a wireless signal transmitted on a wireless communication link are collected and processed to generate CSI data. The generated CSI data are further sampled according to the sampling parameters. For example, the generated CSI data are sampled for a sampling duration at a sampling rate; and the sampled CSI data are further processed to detect motion. In some instances, values of respective sampling parameters of respective wireless communication links are equal; and can be pre-configured and remain constant. In certain instances, values of respective sampling parameters of respective wireless communication links may be different and specified individually; and may be updated by the motion sensing system according to a pre-defined criteria or an algorithm. For example, a constant sampling rate of 100 Hz, 20 Hz, 10 Hz, 5 Hz, 1 Hz or another value and a constant sampling duration of 5 ms, 10 ms, 15 ms, 20 ms, 25 ms, 50 ms, or another value can be used to sample the CSI data for motion detection. The sampling parameters may be adjusted according to the quality of the wireless communication link, whether motion is detected on one of the wireless communication devices on one end of the wireless communication link, or other factors.

In some implementations, motion sensing parameters for a wireless communication link include a weighting factor. In some implementations, the sampled CSI data can be collectively managed and analyzed by a central controller unit (e.g., an application running on a wireless communication device within the motion sensing system or a cloud-based computer system communicating with the motion sensing system). A subset of wireless communication links of a motion sensing system can be used to detect motion within a sub-space, to localize motion within a sub-space during a period of time, or for other purposes. In this case, the sampled CSI data on the subset of wireless communication links may be aggregated with respective weighting factors. In some instances, values of respective weighting factors of respective wireless communication links are equal; and can be pre-configured and remain constant. In certain instances, values of respective weighting factors of respective wireless communication links may be different and specified individually; and may be updated by the user or by the motion sensing system according to a pre-defined criteria or an algorithm. For example, the value of a weighting factor of a wireless communication link may equal 1 or another value in the range of zero to one (or another range of values may be used). The value of a weighting factor may be adjusted according to the quality of the wireless communication link, whether motion is detected on one of the wireless communication devices on one end of the wireless communication link, or other factors.

As shown in FIG. 2B, a first wireless communication link between the first and second wireless communication devices 204A, 204B at the initial and subsequent time steps includes three signal paths, e.g., a direct signal path 226A and two indirect signal paths 216 and 222. At the initial time step $t_0$, a second wireless communication link between the first and third wireless communication devices 204A, 204C includes one direct signal path 226B and three indirect signal paths 218, 220, and 224A. At the subsequent time step $t_1$, the second wireless communication link includes one direct signal path 228 and three indirect signal paths 224B, 232, and 234. In certain instances, the first and second wireless communication links at different time steps may include more signal paths or different signal paths caused by another physical object or medium (e.g., part of a structure, furniture, a living object, etc.) that scatters radio frequency signals in the space 201. Wireless signals along the first and second wireless communication links at different time steps traverse on the respective signal paths.

In some implementations, the third wireless communication device 204C is a mobile access point (e.g., a smartphone, a purpose-built mobile WiFi hotspot, or another type of portable router) of a wireless communication network. The third wireless communication device 204C can access cellular signals and convert the cellular signals to Wi-Fi signals and vice versa, creating a mobile Wi-Fi network that can be shared by multiple users (e.g., the first and second wireless communication devices 204A, 204B). The wireless signals are transmitted among the wireless communication devices within the mobile Wi-Fi network according to a wireless communication protocol.

In some implementations, the third wireless communication device 204C is a client station (STA) device which communicates wireless signals with an AP device (e.g., the first or the second wireless communication device 204A or 204B) which is connected to the Internet through a wired or a wireless connection.

In some implementations, the third wireless communication device 204C includes one or more motion sensor devices. In this case, motion of the third wireless communication device 204C can be detected by processing output data from the motion sensor devices. A motion sensor device includes a gyroscope, an accelerometer, a satellite navigation device, or another type of motion sensor device. In some implementations, the motion sensor device may be implemented as the motion sensor device 450 in the example wireless communication device 400 in FIG. 4. In some implementations, motion of the third wireless communication device 204C can be also detected based on the generated CSI data before or after being sampled. For example, a set of frequency-domain channel responses can be obtained from the CSI data. For each frequency-domain channel response, a time-domain channel response can be calculated based on the corresponding frequency-domain channel response in the CSI data. A filtered time-domain channel response can be generated based on a constraint applied to the time-domain channel response. In this case, filtered time-domain channel responses (e.g., time-domain pulses at longer time delays) may be used to determine the motion of the third wireless communication device 204C. Detecting motion of a mobile wireless communication device based on the CSI data may be performed according to operations of the example process 600 in FIG. 6 or in another manner.

In some implementations, when a wireless communication device used for motion detection has also moved relative to another wireless communication device which remains stationary during a time period when a motion detection event occurs, motion sensing parameters of wireless communication links of the motion sensing system can be updated to account for the motion of the wireless communication device. In some implementations, when the movement of a wireless communication device communicating wireless signals with one or more wireless communication devices on one or more wireless communication links is detected during a time period, sampling parameters for sampling the CSI data generated based on the wireless signals received during the time period or in a subsequent time period can be modified (e.g., reduced or otherwise modified). For example, when the third wireless communication device 204C has moved during a time period (e.g., between the subsequent and initial time steps $t_1$ and $t_0$), the values of the sampling parameters (e.g., sampling rate and/or the sampling duration) for sampling the CSI data generated based on the wireless signals communicated on the second wireless communication link (e.g., between the first and third wireless communication devices 204A, 204C) during the time period can be reduced. Consequently, the CSI data of the second wireless communication link is sampled less frequently, limiting its contribution to motion detection. In other instances, the value of the weighting factor of the sampled CSI data of the second wireless communication link during the time period (e.g., between the subsequent and initial time steps $t_1$ and $t_0$), can be reduced. For example, the value of the weighting factor for the second wireless communication link can be reduced from 1 to 0.5 or to another value.

In some implementations, properties of the motion of the wireless communication device during the time period can be determined. In this case, the values of the updated sampling parameters and the updated weighting factor may be determined according to the motion properties of the third wireless communication device 204C, e.g., amplitude, direction, speed, a duration, etc. For example, when the motion of the third wireless communication device 204C during the time period is above a certain threshold (e.g., a threshold amplitude value, a threshold speed value, etc.), the value of the weighting factor for the sampled CSI data of the second wireless communication link can be set to 0, in which case the sampled CSI data during the time period are discarded (e.g., deleted or otherwise disregarded by the motion sensing system). In a similar situation, when the motion of the third wireless communication device 204C is above a certain threshold value, the values of the sampling parameters during a subsequent time period can also be reduced. For example, instead of sampling the wireless signals on the second wireless communication link at a sampling rate of 10 Hz or at a sampling duration of 15 ms, the sampling rate can be reduced to 1 Hz or the sampling duration can be reduced to 5 ms during one or more subsequent time period until the motion of the third wireless communication device 204 drops below the threshold value, becomes undetectable, or stops. In some instances, multiple threshold values can be used to determine the motion sensing parameters.

Figure 3A:
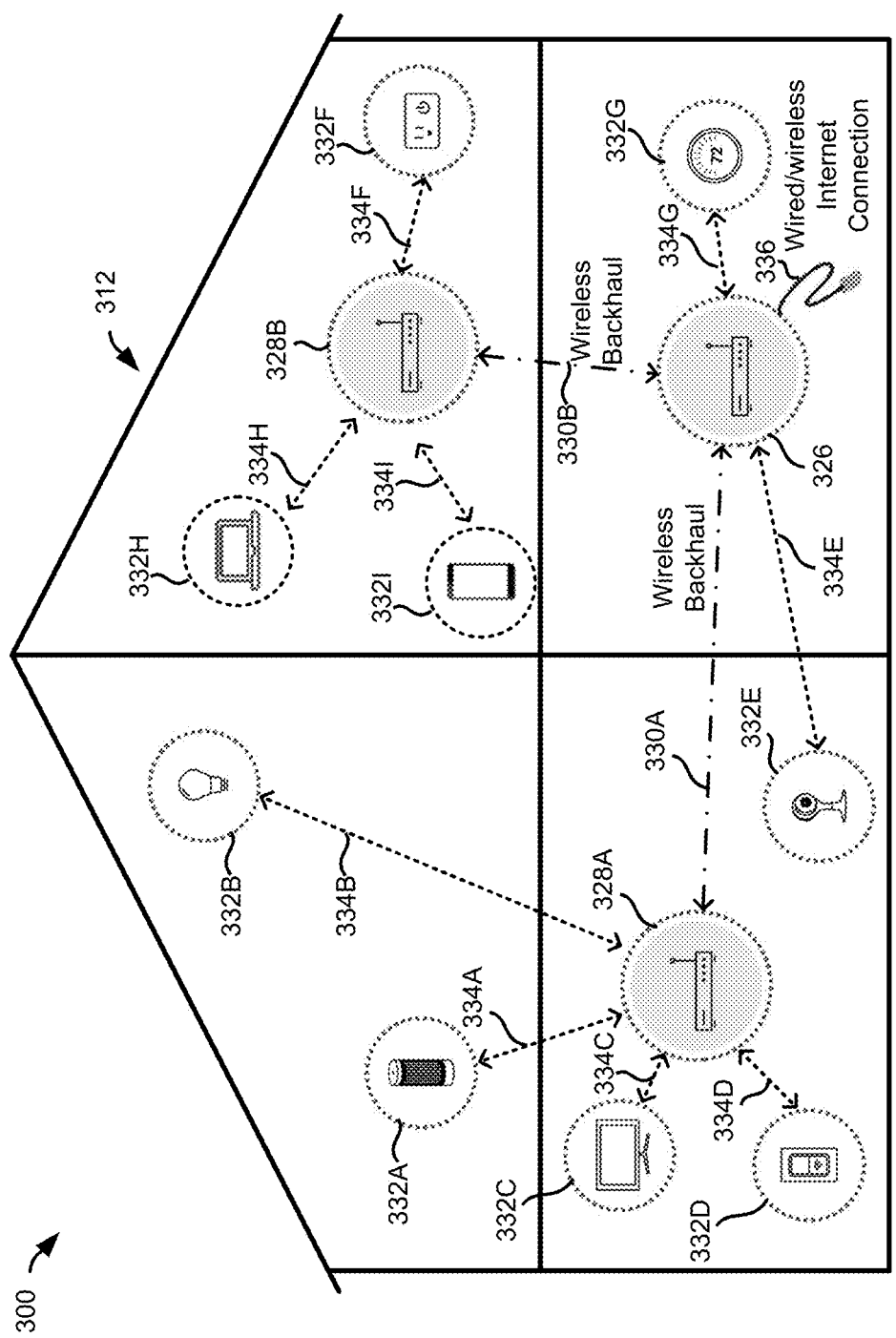
FIG. 3A is a block diagram showing aspects of an example motion sensing system.

FIG. 3A is a block diagram showing aspects of an example motion sensing system 300. As shown in FIG. 3A, the motion sensing system 300 may operate as the example motion sensing systems 200, 230 in FIGS. 2A-2B, or in another manner.

As shown in FIG. 3A, the motion sensing system 300 includes a wireless communication network. In some implementations, the motion sensing system 300 is based on a multi-AP wireless communication network (e.g., a mesh network or a Self-Organizing-Network (SON)) that includes multiple access point (AP) devices (e.g., the AP devices 326, 328A, 328B) and multiple client station (STA) devices (e.g., the STA devices 332A, 332B, 332C, 332D, 332E, 332F, 332G, 332H, and 332I). The STA device communicates with associated AP devices on respective wireless communication links (e.g., the wireless communication links 334A, 334B, 334C, 334D, 334E, 334F, 334G, 334H, and 334I). The multi-AP wireless communication network may operate based on a wireless communication standard, examples being Wi-Fi Direct (which may have STA-to-STA information), the IEEE 802.11md standard, and the IEEE 802.11ax standard.

The example space 312 shown in FIG. 3A is a home that includes multiple distinct spatial regions or zones. In the example shown, the motion sensing system 300 is based on a multi-AP home Wi-Fi network, which includes three AP devices, e.g., a central AP device 326 and two extension AP devices 328A, 328B. In the multi-AP home Wi-Fi network, each AP device can support multiple frequency bands (e.g., 2.4 GHz or 5 GHz), and multiple frequency bands may be enabled at the same time. Each AP device may use a different Wi-Fi channel to serve its associated STA devices, as this may allow for better spectrum efficiency.

In the example shown in FIG. 3A, the other AP devices (e.g., the extension AP devices) 328A, 328B connect to the central AP device 326 wirelessly, through respective wireless backhaul connections 330A, 330B. The central AP device 326 may select a wireless communication channel/link different from those with the extension AP devices to serve its associated STA devices. The extension AP devices 328A, 328B connect to the central AP device 326 using the respective wireless backhaul connections 330A, 330B to move network traffic between the AP devices and provide a gateway to the Internet. The extension AP devices 328A, 328B extend the range of the central AP device 326, by allowing STA devices to connect to a potentially closer AP device or different channel, thus yielding the wireless communication topology of the multi-AP home Wi-Fi network shown in FIG. 3A. In some examples, respective STA devices are designated or associated to respective AP devices in the wireless communication topology. Each of the extension AP devices 328A, 328B may select a different wireless communication link to serve its associated STA devices.

In the example shown in FIG. 3A, the STA devices 332A, 332B, 332C, 332D, 332E, 332F, 332G, 332H, and 332I connect to either the central AP device 326 or one of the extension AP devices 328A, 328B, using the respective wireless communication links 334A, 334B, 334C, 334D, 334E, 334F, 334G, 334H, and 334I as shown in FIG. 3A. The STA devices 332A, 332B, 332C, 332D, 332E, 332F, 332G, 332H, 332I may include mobile devices, a smartphone, a smart watch, a tablet, a laptop computer, a smart thermostat, a wireless-enabled camera, a smart TV, a wireless-enabled speaker, a wireless-enabled power socket, a wireless-enabled light bulb, a wireless-enabled switch, or any other types of wireless-enabled devices.

In the example shown in FIG. 3A, the central AP device 326 is connected to the wired Internet connection 336, which extends internet connectivity to the multi-AP home Wi-Fi network. As such, Internet bound traffic from STA devices connected to an AP device (e.g., the extension AP devices 328A, 328B) without a wired Internet connection are carried on a respective wireless backhaul connection (e.g., the wireless backhaul connection 330A or 330B) to an AP device (e.g., the central AP device 326) with a wired Internet connection.

In some implementations, the central AP device 326 is a mobile wireless router (e.g., a mobile hotspot) which communicates with a base station in a cellular wireless communication network according to a cellular network standard. In this case, the central AP device 326 may be a handheld device that can be moved within the space 312 or even out of the space 312 (e.g., into a garage, or back yard, driveway, etc.). In some implementations, the central AP device 326 may have moved when a motion detection event happens in a space traversed by wireless signals between the central AP device 326 and each of the associated STA devices 332E, 332G and other AP devices 328A, 328B. In this case, motion sensing parameters for the wireless communication links 334E, 334G, 330A, 330B can be updated.

In some implementations, the central AP device 326 may include one or more motion sensor devices that are configured to determine properties of the motion of the central AP device 326. For example, the central AP device 326 may include a gyroscope, an accelerometer, a satellite navigation device (e.g., a GPS unit), or other types of motion sensing devices that are able to detect motion of the central AP device 326. The output signals from the one or more motion sensor devices can be processed to determine properties of the motion of the central AP device 326; the properties may include one or more of speed, direction, acceleration, distance, magnitude, orientation, etc. In some implementations, the properties of the motion of the central AP device 326 can be used to update motion sensing parameters of the motion sensing system 300. For example, a value of a sampling parameter (e.g., a sampling rate or a sampling duration) for sampling the CSI data of a corresponding wireless communication link can be modified (e.g., reduced or increased). A value of a weighting factor of the wireless communication link can be modified (e.g., reduced or increased). In some instances, the sample CSI data of the wireless communication link can be discarded, for example by setting the values of the sampling parameters or the weighting factor to zero. In some cases, other processes can be performed to sample or process the CSI data according to the updated motion sensing parameters to detect motion of an object other than the central AP device 326, in the space during the time period. In some instances, the properties of the motion of the central AP device 326 can be communicated to a cloud-based computer system, on which the CSI data is sampled and processed to detect motion.

Figure 3B:
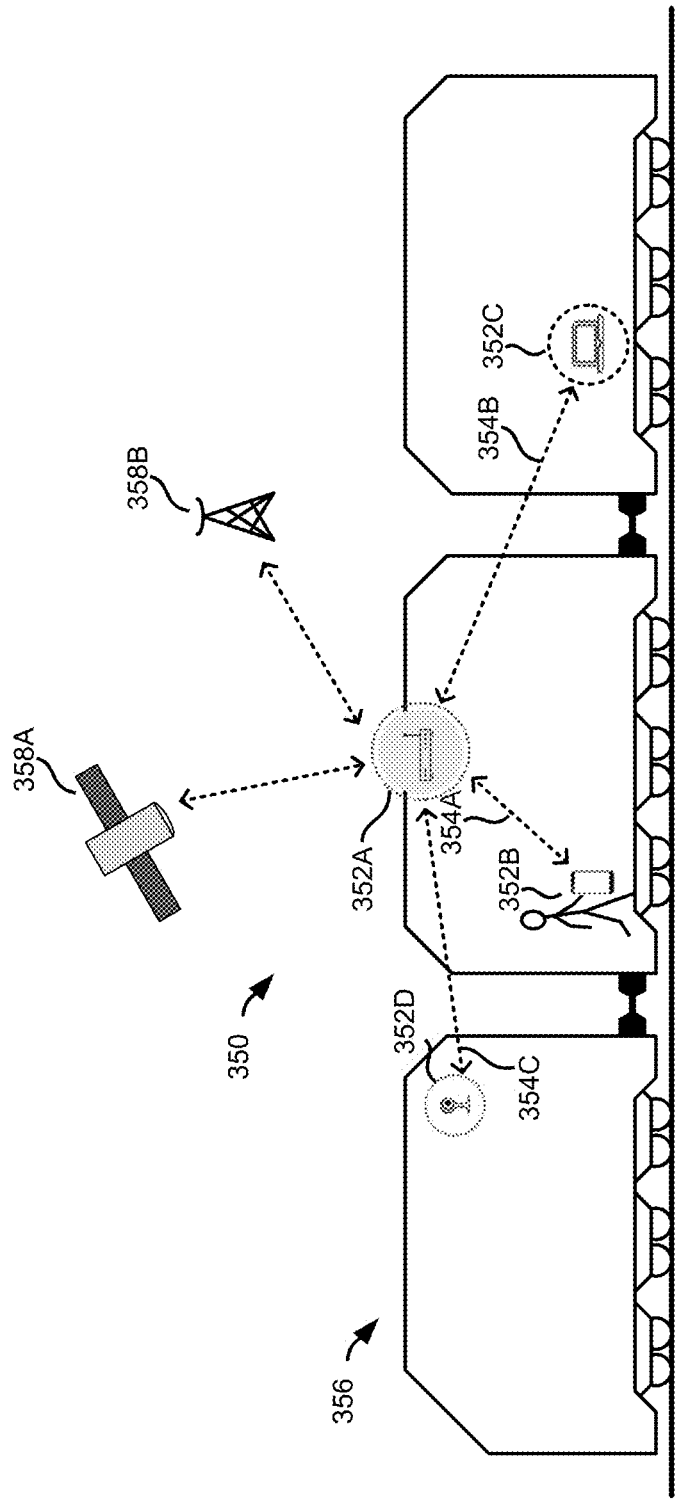
FIG. 3B is a block diagram showing aspects of an example motion sensing system.

FIG. 3B is a block diagram showing aspects of an example motion sensing system 350. The motion sensing system 350 includes multiple wireless communication devices 352 that communicate wireless signals with one another on wireless communication links 354. As shown in FIG. 3B, the wireless communication device 352A is a central AP device, which communicates with multiple other associated wireless communication devices 352B, 352C, 352D on respective wireless communication links 354A, 354B, 354C. The wireless communication device 352A connects to the Internet wirelessly through a satellite 358A or a base station 358B of a cellular communication network. In certain instances, the wireless communication device 352A may access the Internet in another manner.

As shown in FIG. 3B, the motion sensing system 350 may operate as the example motion sensing system 300 in FIG. 3A or in another manner. As shown in FIG. 3B, the motion sensing system 350 resides on a transportation platform 356 (e.g., a train) that can move in a global coordinate. In certain instances, the transportation platform 356 can be a car, an airplane, a ship vessel, or another type of transportation platform. In some instances, a wireless communication device 352 may be stationary relative to the transportation platform 356 (e.g., a hotspot AP device 352A or a security camera 352D fixed on the train); or may move relative to the transportation platform 356 (e.g., a mobile phone 352B or a laptop computer 352C carried by a passenger on the train). The wireless communication device 352 includes a motion sensor device. The motion sensor device may be implemented as the motion sensor device 450 of the wireless communication device 400 in FIG. 4 or in another manner. In some instances, the motion sensor device 450 can determine a motion of the wireless communication device 352 relative to the transportation platform 356 or another wireless communication device 352 that remains stationary on the transportation platform 356.

In some implementations, each of wireless communication links 354 between two wireless communication devices 352 is assigned respective motion sensing parameters, e.g., sampling rate, sampling duration, weighting factor, or another motion sensing parameter. In some instances, wireless signals transmitted on respective wireless communication links 354 may be collected and CSI data may be generated based on the collected wireless signals. The CSI data are then sampled according to certain sampling parameters (e.g., a certain sampling rate and a certain sampling duration); and the sampled CSI data are further processed and analyzed for motion detection. For example, CSI data on a wireless communication link 354 maybe sampled at a sampling rate of 10 Hertz (Hz) and a sampling duration of 15 microseconds (ms). In some instances, wireless signals sampled on a subset of wireless communication links 354 can be aggregated together to determine a collection of motion events within a sub-space; to determine a trajectory of an object within a sub-space; to track a motion of an object within a sub-space; etc. For a wireless communication device (e.g., the AP device 352A) that has multiple wireless communication links 354, the sampled CSI data of the subset of wireless communication links 354 can be aggregated, e.g., by the wireless communication device 352A or a cloud-based computer system, according to their corresponding weighting factors.

When motion of a wireless communication device 352 relative to another wireless communication device 352 that remains stationary on the transportation platform 356 is detected, motion sensing parameters of the motion sensing system 350 can be updated. As shown in FIG. 3B, when motion of a wireless communication device 352B relative to another wireless communication device 352A that remains fixed on the transportation platform 356 is first detected at a first time step and such motion becomes nondetectable (e.g., within a threshold value) at a second time step, values of the sampling parameters of the wireless communication links 354A can be reduced during a time period between the second and first time steps. In some instances, after the second time step, the values of the sampling parameters of the wireless communication links 354A can be increased (e.g., return back to values at normal settings). For another example, when motion of a wireless communication device 352B relative to another wireless communication device 352A that remains fixed on the transportation platform 356 is detected during a time period, the values of the sampling rates and/or sampling durations remain unchanged during the same time period or a subsequent time period. Instead, a value of a weighting factor of the sampled CSI data of the wireless communication link 354A can be reduced to effectively reduce the contribution of the sampled CSI data of the wireless communication link 354A to motion detection. In some implementations, other motion sensing parameters may be reduced, increased, or otherwise updated in order to compensate, eliminate, or otherwise reduce the effect of the motion of the wireless communication device 352 on the performance of motion detection of objects other than the wireless communication device 352 itself.

Figure 4:
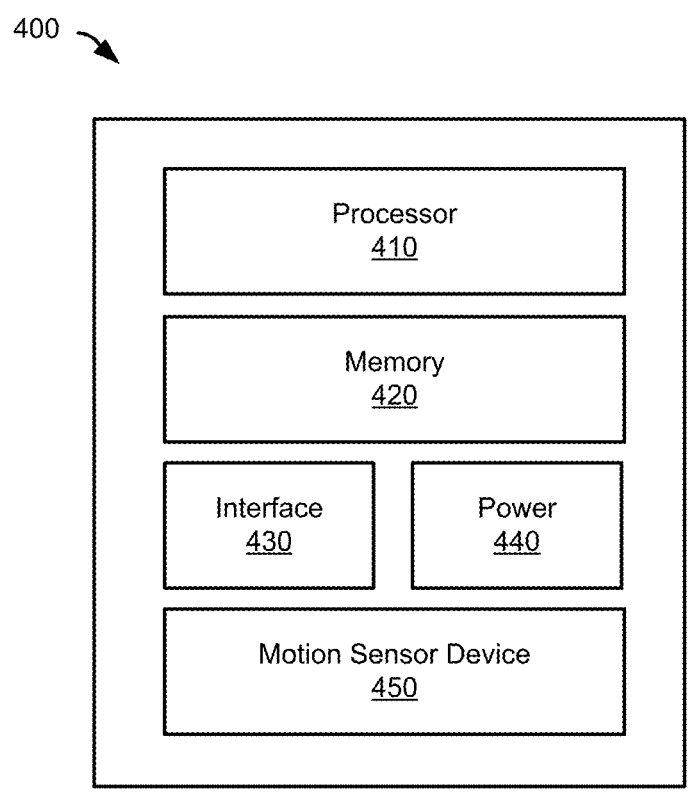
FIG. 4 is a block diagram showing an example wireless communication device in a motion sensing system.

FIG. 4 is a block diagram showing an example wireless communication device 400. In some implementations, the example wireless communication device 400 is implemented as the wireless communication device 102, 204 in FIGS. 1 and 2A-2B. The example wireless communication device 400 may be deployed as the STA devices 332, 352B, 352C, 352D or the AP devices 326, 328, 352A in FIGS. 3A-3B. As shown in FIG. 4, the example wireless communication device 400 includes a processor 410, a memory 420, an interface 430, a power unit 440, and a motion sensor device 450. A wireless communication device may include multiple of the components shown in FIG. 4 (e.g., multiple processors, multiple memory components, multiple motion sensor devices, etc.). The example wireless communication device 400 may include additional or different components, and the wireless communication device 400 may be configured to operate as described with respect to the examples above or in another manner. In some implementations, the components of the wireless communication device 400 are housed together in a common housing or other assembly. In some implementations, one or more of the components of a wireless communication device can be housed separately, for example, in a separate housing or other assembly.

In some implementations, the interface 430 communicates (e.g., receives, transmits, or both) wireless signals. For example, the interface 430 may be configured to communicate radio frequency (RF) signals formatted according to a wireless communication standard (e.g., Wi-Fi, 4G, 5G, Bluetooth, etc.). In some implementations, the interface 430 includes a radio subsystem and a baseband subsystem. The radio subsystem may include, for example, one or more antennas and radio frequency circuitry. The radio subsystem can be configured to communicate radio frequency wireless signals on the wireless communication channels. As an example, the radio subsystem may include a radio chip, an RF front end, and one or more antennas. The baseband subsystem may include, for example, digital electronics configured to process digital baseband data. In some cases, the baseband subsystem may include a digital signal processor (DSP) device or another type of processor device. In some cases, the baseband system includes digital processing logic to operate the radio subsystem, to communicate wireless communication network traffic through the radio subsystem or to perform other types of processes.

In some implementations, the processor 410 executes instructions, for example, to generate output data based on data inputs. The instructions can include programs, codes, scripts, modules, or other types of data stored in the memory 420. Additionally or alternatively, the instructions can be encoded as pre-programmed or re-programmable logic circuits, logic gates, or other types of hardware or firmware components or modules. The processor 410 may be or include a general-purpose microprocessor, as a specialized co-processor or another type of data processing apparatus. In some cases, the processor 410 performs high level operation of the wireless communication device 400. For example, the processor 410 may be configured to execute or interpret software, scripts, programs, functions, executables, or other instructions stored in the memory 420. In some implementations, the processor 410 may be included in the interface 430 or another component of the wireless communication device 400.

In some implementations, the memory 420 includes computer-readable storage media, for example, a volatile memory device, a non-volatile memory device, or both. The memory 420 may include one or more read-only memory devices, random-access memory devices, buffer memory devices, or a combination of these and other types of memory devices. In some instances, one or more components of the memory 420 can be integrated or otherwise associated with another component of the wireless communication device 400. The memory 420 may store instructions that are executable by the processor 410. For example, the instructions may include instructions to perform one or more of the operations of the example process 500 and 504 in FIGS. 5A and 5B.

In some implementations, the power unit 440 provides power to the other components of the wireless communication device 400. For example, the other components may operate based on electrical power provided by the power unit 440 through a voltage bus or other connection. In some implementations, the power unit 440 includes a battery or a battery system, for example, a rechargeable battery. In some implementations, the power unit 440 includes an adapter (e.g., an AC adapter) that receives an external power signal (from an external source) and converts the external power signal to an internal power signal conditioned for a component of the wireless communication device 400. The power unit 440 may include other components or operate in another manner.

In the example shown in FIG. 4, the motion sensor device 450 can sense motion of the wireless communication device 400. In some instances, a motion sensor device 450 can include a gyroscope, an accelerometer, a satellite navigation device, or another type of motion sensor device. A gyroscope (or a gyrometer) allows a determination of orientation and rotation and accurate recognition of movement within a 3D space. In some instances, a gyroscope may be a microchip-packaged MEMS (microelectromechanical system) gyroscope, a Foucault gyroscope, or another type. An accelerometer may be a single- or multi-axis accelerometer which can detect both the magnitude and the direction of proper acceleration. A satellite navigation device is a receiver device that can retrieve location and time information from space-based satellite navigation systems and then calculate the device's geographical position. For example, space-based satellite navigation systems include GNSS (global navigation satellite systems), BDS (Beidou Navigation Satellite Systems), Galileo, and GLONASS.

In some implementations, the motion sensor device 450 outputs signals that can be processed by the processor 410 to determine the motion properties of the wireless communication device 400. In some cases, the motion properties of the wireless communication device 400 include direction, amplitude, speed, duration, etc. In some implementations, the output from the motion sensor device 450 is used to guide operations of a motion sensing system that can detect motion of objects other than the wireless communication device 400 itself. For example, the motion properties of the wireless communication device 400 determined by the motion sensor devices 450 may be used to update motion sensing parameters of the motion sensing system or in another manner.

Figure 5:
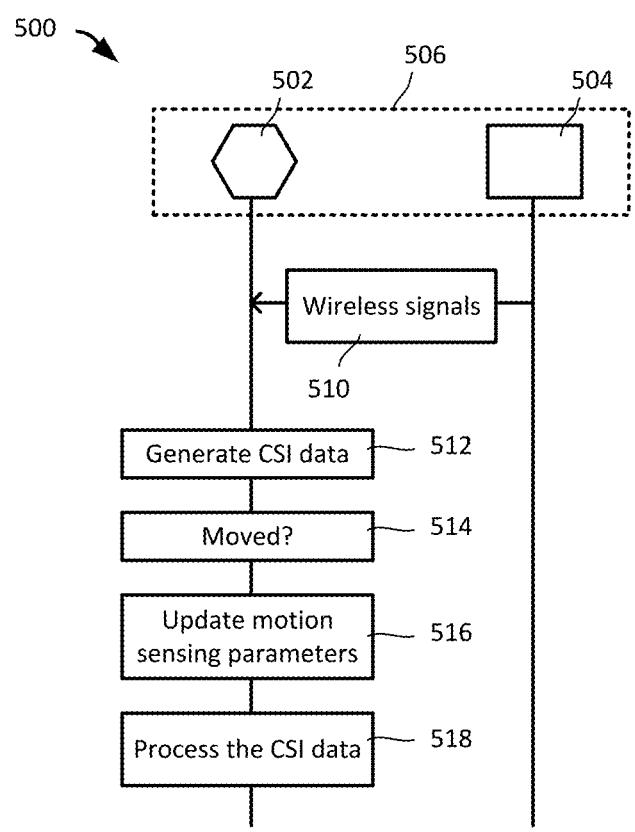
FIG. 5 is a ladder diagram showing aspects of an example process.

FIG. 5 is a ladder diagram showing aspects of an example process 500. The example process 500 can be performed between a first wireless communication device 502 and a second wireless communication device 504 within a motion sensing system 506. In some instances, the motion sensing system 506 may include multiple wireless communication devices (e.g., multiple AP devices and multiple STA devices). In some implementations, the wireless communication devices within the motion sensing system 506 communicate with one another on respective wireless communication links forming a wireless communication network (e.g., the Wi-Fi network of the motion sensing system 200, 230 in FIGS. 2A-2B, the multi-AP home Wi-Fi network of the motion sensing system 300 in FIG. 3A, and the Wi-Fi network of the motion sensing system 350 in FIG. 3B). In some implementations, the wireless communication network is a standardized wireless communication network that executes the example process 500 and operates based on a wireless communication standard, examples being Wi-Fi Direct, the IEEE 802.11md standard, and the IEEE 802.11ax standard.

The motion sensing system 506 may be implemented as the motion sensing system 200, 230, 300, 350 in FIGS. 2, 3A, 3B, or in another manner. In some implementations, the first wireless communication device 502 is a mobile device; and the second wireless communication device 504 is stationary relative to a platform on which the motion sensing system 506 resides (e.g., within the space in a house as shown in FIG. 3A, the space in a transportation platform in FIG. 3B). In some instances, the first wireless communication device 502 can be a mobile AP device, a mobile router, or a mobile hotspot device; and the second wireless communication device 504 can be an associated STA device. In certain instances, the second wireless communication device 504 can be an AP device with a wired or wireless connection to the Internet; and the first wireless communication device 502 can be an associated mobile STA device (e.g., a mobile phone, a laptop computer, etc.).

In some implementations, the example process 500 detects motion of the first wireless communication device 502 relative to the second wireless communication device 504 or relative to the platform in which the motion sensing system 506 resides; updates motion sensing parameters of the motion sensing system 506 (e.g., the motion sensing parameters of the wireless communication link between the first and second wireless communication devices 502,504, and possibly other wireless communication links between the first wireless communication device 502 and other wireless communication devices within the motion sensing system 506) in response to detecting motion of the first wireless communication device 502; and detects and localizes motion of another object in the space (i.e., an object other than the first wireless communication device 502). The example process 500 as shown in FIG. 5 may include additional or different operations, including operations performed by additional or different components, and the operations may be performed in the order shown or in another order. In some cases, operations in the example process 500 can be combined, iterated or otherwise repeated, or performed in another manner.

At 510, wireless signals transmitted by the second wireless communication device 504 are received by the first wireless communication device 502 during a time period. For example, when the first wireless communication device 502 is a mobile router, the wireless signals received from the second wireless communication device 504 may be scheduled non-data packet transmissions. When the first wireless communication device 502 is a mobile STA device, the wireless signals received from the second wireless communication device 504 may be beacon frames transmitted at a pre-determined clock rate. Other types of wireless signals may be used.

At 512, CSI data are generated. In some implementations, the CSI data of the wireless communication link between the first and second wireless communication devices 502, 504 are generated, by operation of the first wireless communication device 502, based on the wireless signals received and sampled on the wireless communication link during operation 510. For example, the CSI data can be measured from a wireless communication link per orthogonal frequency division multiplexing (OFDM) sub carriers for each received packet. For example, when the first wireless communication device 502 receives non-data packets from the second wireless communication device 504 during the time period, the packets can be captured by the first wireless communication device 502 and the corresponding CSI data can be determined based on the packet and stored in a memory device of the first wireless communication device 502 or transmitted to a remote computer system (e.g., a cloud-based computer system). In some instances, the generated CSI data can be pre-processed, for example, filtered to remove noise, before being processed for motion detection.

At 514, whether the first wireless communication device 502 has moved during the time period is determined. In some implementations, during operation 514, output from one or more motion sensor devices of the first wireless communication device 502 is collected, processed, and analyzed by a processor of the first wireless communication device 502. For example, the motion sensor device of the first wireless communication device 502 may include an accelerometer, a gyroscope, a satellite navigation device, or another type of motion sensor device. In some implementations, the motion sensor devices are implemented as the motion sensor devices 450 in the wireless communication device 400 shown in FIG. 4 or in another manner.

In some implementations, whether the first wireless communication device 502 has moved during the time period is determined according to the generated CSI data determined from the wireless signals during the time period at operation 512. For example, the CSI data can be processed according to the operations in the example process 600 in FIG. 6 to determine whether the first wireless communication device 502 has moved during the time period. The generated CSI data may be used in another manner to determine motion of the first wireless communication device 502.

In response to the first wireless communication device 502 having moved during the time period, the example process 500 continues with operation 516, in which motion sensing parameters of the motion sensing system 506 are updated in order to compensate, eliminate, or otherwise reduce the effect of the motion of the first wireless communication device 502 on motion detection of objects other than the first wireless communication device 502 itself. In response to the first wireless communication device 502 having not moved during the time period, the example process 500 continues with operation 518, in which CSI data is processed according to pre-determined motion sensing parameters.

In some implementations, motion sensing parameters of a motion sensing system include sampling parameters (e.g., a sampling rate, a sampling duration, etc.) and a weighting factor for each of the wireless communication links within the motion sensing system. In some instances, the motion sensing parameters include other parameters for sampling the generated CSI data and using the sampled CSI data for motion sensing. In some instances, initial values of the motion sensing parameters are set when the motion sensing system 506 is initially configured; and the values of the motion sensing parameters can be updated in response to an event or condition (e.g., in response to a determination that the first wireless communication device 502 has moved). For example, when the motion of the first wireless communication device 502 is detected during the time period, values of the sampling rates and/or sampling durations for sampling the CSI data during the time period can be reduced. For another example, when the motion of the first wireless communication device 502 is detected during the time period, the values of the sampling rates and/or sampling durations for sampling the CSI data can remain unchanged during the same time period. Instead, a value of a corresponding weighting factor of the sampled CSI data can be reduced to effectively reduce the contribution of the sampled CSI data of the wireless communication link to motion detection. In some implementations, values of other motion sensing parameters may be reduced, increased, or otherwise updated to reduce or eliminate the effect of motion of the first wireless communication device 502 on the motion sensing performance of the motion sensing system 506. In some instances, values of the motion sensing parameters can be determined according to the motion properties of the first wireless communication device 502 based on a pre-determined algorithm or in another manner.

At 518, the CSI data are processed. In some implementations, the CSI data are processed according to the updated motion sensing parameters determined during operation 516. For example, when motion of the first wireless communication device 502 is detected during the time period, the CSI data can be sampled at the updated sampling parameters. In some instance, the values of the sampling parameters for sampling the CSI data during a subsequent time period can be also reduced. For another example, when motion of the first wireless communication device 502 is detected during the time period, the CSI data can be sampled at the initial values of the sampling parameters (e.g., when the motion sensing system is initially configured) and the sampled CSI data can be processed at an updated weighting factor. In certain instances, the CSI data can be processed according to other updated motion sensing parameters.

In some aspects, the sampled CSI data for each of the wireless communication links may be analyzed to detect whether an object is present or absent, e.g., when no motion is detected in the space. The sampled CSI data can be analyzed and processed to detect and/or localize motion of an object in the space other than the motion of the first wireless communication device 502. In some instances, the first wireless communication device 502 can output motion data after processing the sampled CSI data. In some instances, the motion data indicates a degree of motion in the space, the location of motion in the space, a time at which the motion occurred, a duration of the motion, or a combination thereof. In some instances, the motion data can include a motion score, which may include, or may be, one or more of the following: a scalar quantity indicative of a level of signal perturbation in the environment accessed by the wireless signals; an indication of whether there is motion; an indication of whether there is an object present; or an indication or classification of a gesture performed in the environment accessed by the wireless signals.

In some instances, the motion of the first wireless communication device 502 may cease or become undetectable. For example, the motion of the first wireless communication device 502 can come to a stop at any time step after the time period and the first wireless communication device 502 can become stationary relative to the second wireless communication device 504. In some instances, motion of other wireless communication devices of the motion sensing system 506 may be detected at any time step. In these cases, the motion sensing parameters of respective motion sensing links can be updated accordingly, e.g., increased from the reduced value back to a value at a prior setting (e.g., a default or initial value when all the wireless communication devices are stationary relative to one another); and the sampled CSI data can be generated based on wireless signals received during a subsequent time period under the updated motion sensing parameters. In some instances, the operations in the example process 500 can be repeated when motion of the first wireless communication device 502 or other wireless communication devices is detected.

Figure 6:
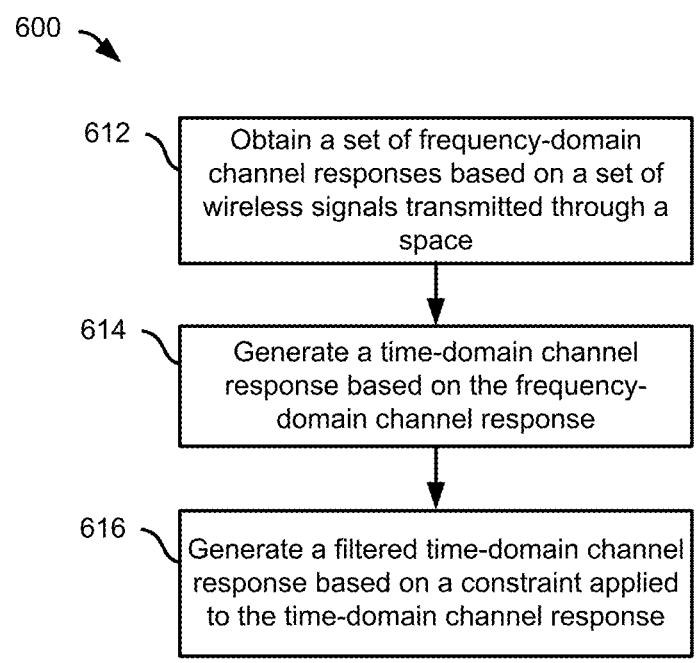
FIG. 6 is a flow chart showing aspects of an example process for detecting motion of a wireless communication device in a motion sensing system.

FIG. 6 is a flow chart showing aspects of an example process 600 for determining motion of a wireless communication device. In some instances, the example process 600 may be performed by a wireless communication device (e.g., an AP device or a STA device) of a motion sensing system to determine its motion. In some instances, the AP device of the motion sensing system for performing the example process 600 is a mobile router, a mobile hotspot, a mobile AP device, an AP device with a multi-AP controller, or an AP device with a wireless internet connection. In some instances, the STA device that performs the example process 600 is a mobile STA device, a mobile WiFi enabled wireless communication device, or another type of wireless communication device. In some implementations, the wireless communication device that performs the example process 600 can be implemented as the first wireless communication device 502 in FIG. 5 or in another manner. In the following discussion, the process 600 is describe with respect to the example wireless communication system 700 shown in FIG. 7 and the example plots 800, 810, 820 shown in FIG. 8A, 8B, 8C. The example process 600 as shown in FIG. 6 may include additional or different operations, including operations performed by additional or different components, and the operations may be performed in the order shown or in another order. In some cases, operations in the example process 600 as shown in FIG. 6 can be combined, iterated or otherwise repeated, or performed in another manner.

At 612, a set of frequency-domain channel responses is obtained from CSI data. In some instances, the CSI data are generated, e.g., by operation of a first wireless communication device 702A based on wireless signals received on a wireless communication link from a second wireless communication device 702B. In some instances, the generated CSI data can be sampled according to sampling parameters. Each frequency-domain channel response $H_i(f)$ from the set of frequency-domain channel responses corresponds to a respective wireless signal from the set of wireless signals. In some implementations, each frequency-domain channel response $H_i(f)$ from the set of frequency-domain channel responses $\{H_1(f), H_2(f), \ldots, H_n(f)\}$ is processed using operations 612, 614.

Figure 7:
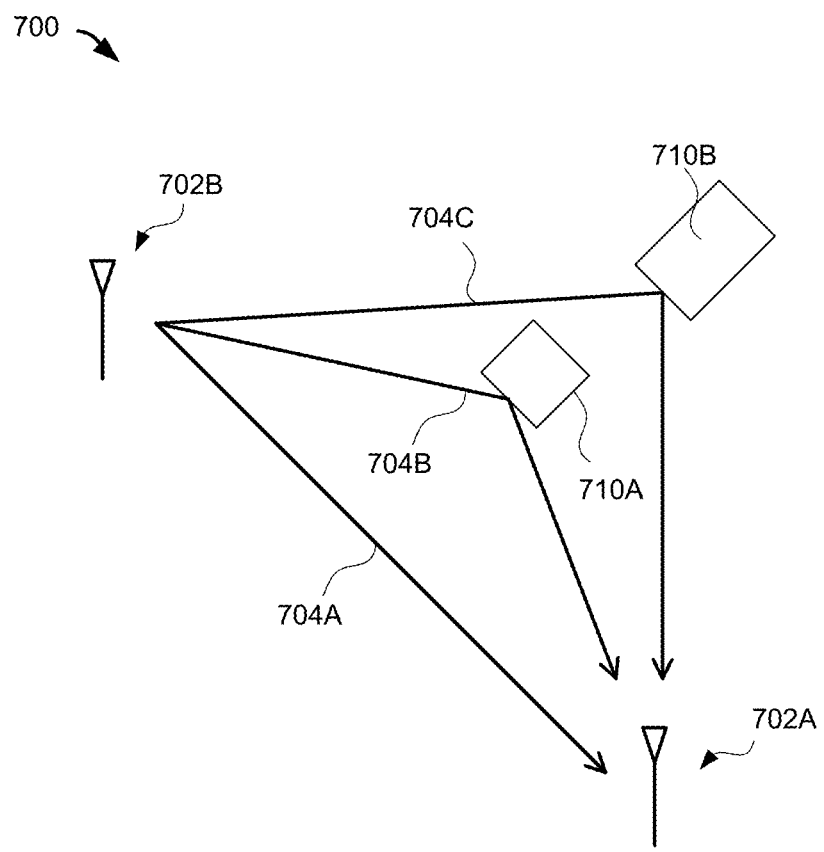
FIG. 7 is a block diagram showing example signal paths in a wireless communication system.

FIG. 7 is a block diagram showing aspects of an example wireless communication system 700. The example wireless communication system 700 shown in FIG. 7 includes a first wireless communication device 702A and a second wireless communication device 702B. The first and second wireless communication devices 702A, 702B can be implemented, for example, the wireless communication devices 102A, 102B shown in FIG. 1, the wireless communication devices 204A, 204B, 204C shown in FIGS. 2A and 2B, the wireless communication devices 326, 328, 332, 352 shown in FIGS. 3A-3B, the wireless communication devices 400 in FIG. 4, or may be other types of wireless communication devices. The wireless communication system 700 operates in an environment that includes two scatterers 710A, 710B. The wireless communication system 700 and its environment may include additional or different features.

In the example shown in FIG. 7, the second wireless communication device 702B transmits a radio frequency (RF) wireless signal, and the first wireless communication device 702A receives the wireless signal. The wireless signal transmitted by the second wireless communication device 702B may be one of the wireless signals in the set of wireless signals transmitted through the environment between the wireless communication devices 702A, 702B. In the environment between the first and second wireless communication devices 702A, 702B, the wireless signal interacts with the scatterers 710A, 710B. The scatterers 710A, 710B can be any type of physical object or medium that scatters radio frequency signals, for example, part of a structure, furniture, a living object, etc.

In the example shown in FIG. 7, the wireless signal traverses a direct signal path 704A and two indirect signal paths 704B, 704C. Along signal path 704B from the second wireless communication device 702B, the wireless signal reflects off the scatterer 710A before reaching the first wireless communication device 702A. Along signal path 704C from the second wireless communication device 702B, the wireless signal reflects off the scatterer 710B before reaching the first wireless communication device 702A.

Figure 8A:
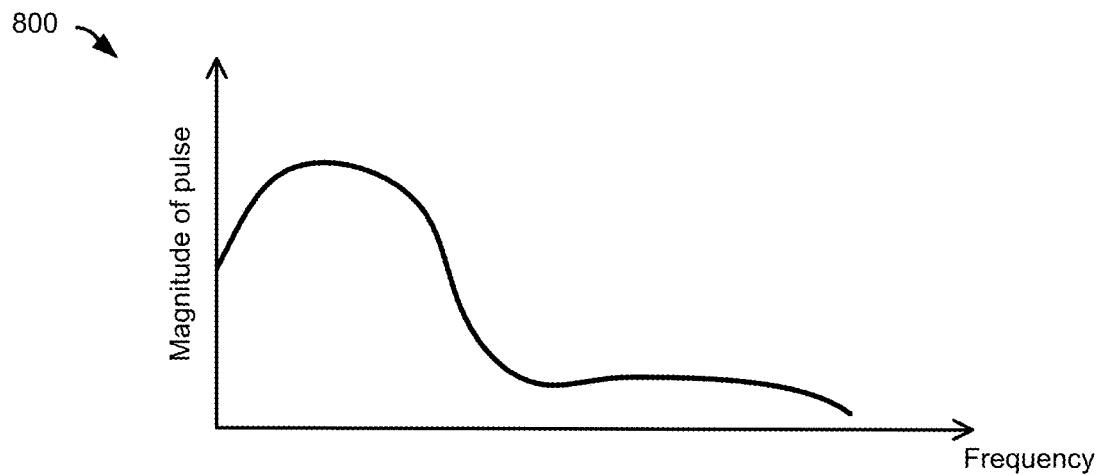
FIG. 8A is a plot showing an example frequency-domain channel response E(f).

FIG. 8A is a plot 800 showing magnitude of the pulses as a function of frequency. The plot 800 is an example frequency-domain channel response obtained in the propagation environment shown in FIG. 7. As shown in FIG. 8A, an observed frequency-domain channel response $H_i(f)$ is received (e.g., at the first wireless communication device 702A) over a set of frequencies. The observed frequency-domain channel response $H_i(f)$ may be obtained based on frequency-domain signals included in one or more Legacy PHY fields (e.g., L-LTF, L-STF) of the received wireless signal, or based on frequency-domain signals included in one or more MIMO training fields (e.g., HE-LTF, VHT-LTF, HT-LTF) of the received wireless signal.

At 614, a time-domain channel response is generated based on the frequency-domain channel response. In some instances, the time-domain channel response $h_i(t)$ is generated using a frequency-to-time converter that converts a signal from the frequency-domain to the time-domain. In some implementations, a frequency-to-time converter may implement a Fourier transform, an inverse Fourier transform, or another type of transformation that converts a frequency-domain signal to its corresponding time-domain signal.

Figure 8B:
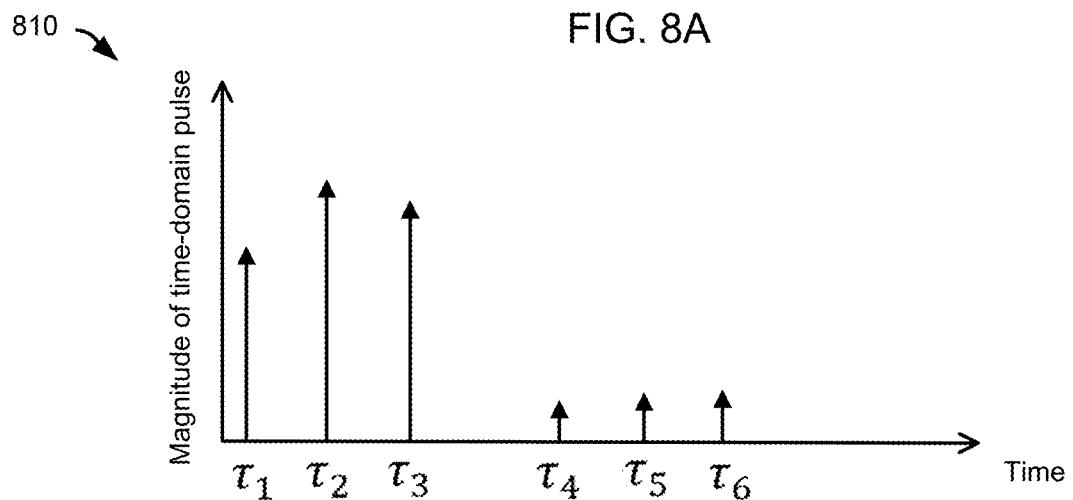
FIG. 8B is a plot showing example time-domain pulses that correlate with the frequency-domain channel response E(f) in FIG. 8A.

As shown in FIG. 8B, the time-domain channel response includes pulses at different locations along the time axis. The time-domain channel response may have additional or different pulses or other features. The number of pulses, as well as their respective locations on the time axis and their respective magnitudes, may vary according to the scattering profile of the environment. In some instances, distance and direction of motion of the first wireless communication device 702A in the propagation environment can be inferred by looking at the behavior of these pulses over time.

Referring to FIG. 7, the scatterer 710A represents a first object at a first location and the scatterer 710B represents a second object at a second location. Since the first location is closer to the two wireless communication devices 702A, 702B, the signal path 704B is shorter than the signal path 704C. In a time-domain channel response, wireless signals reflected by the scatterer 710B are located at time steps with longer time delays; while wireless signals reflected by the scatterer 710A are located at time steps with shorter time delays.

FIG. 8B is a plot 810 showing magnitude of time-domain pulses as a function of time. The plot 810 is an example time-domain channel impulse response with pulses corresponding to different signal paths (e.g., the different signal paths 704A, 704B, 704C in FIG. 7). In some implementations, the time-domain channel response $h_i(t)$ can be expressed in terms of its attenuation factor $\alpha_k$ and pulse times $\tau_k$. The impulse response can be used to distinguish between reflections from closer objects (e.g., the scatterer 710A) and reflections from farther objects (e.g., the scatterer 710B). In some instances, the time-domain channel response obtained from the CSI data can distinguish wireless signals reflected by farther objects from wireless signals reflected by closer objects. For example, a wireless signal reflected by an object outside the transportation platform can have a longer delay than a wireless signal reflected by the transportation platform or an object inside the transportation platform.

As shown in FIG. 8B, the propagation environment can be described by six pulses distributed across the time axis (at times $\tau_1$, $\tau_2$, $\tau_3$, $\tau_4$, $\tau_5$, and $\tau_6$). In this example, the pulses at time $\tau_1$ and $\tau_2$ can represent the impulse responses corresponding to signal paths 704A, 704B in FIG. 7; and the pulse at time $\tau_6$ represents the impulse response corresponding to signal path 704C in FIG. 7. Other pulses, e.g., at time $\tau_3$, $\tau_4$, $\tau_5$ may represent impulse responses corresponding to signal paths scattered by other portions of the same scatter or by a different scatter. The size of each pulse in FIG. 8B represents the magnitude of the respective attenuation factor $\alpha_k$ for respective signal path k.

At 616, a filtered time-domain channel response $\hat{h}_t(t)$ is generated based on a constraint applied to the time-domain channel response $h_t(t)$. In some instances, a constrained least squares optimization process may be used to generate the filtered time-domain channel response $\hat{h}_t(t)$. The constraint applied to the time-domain channel response $h_t(t)$ may be representative of the propagation environment in which the motion sensing system operates. Specifically, one or more constraints may be imposed on the time-domain channel response $h_t(t)$ or a filtered time-domain channel response $\hat{h}_t(t)$ can be obtained. The one or more constraints may be a constraint on the coefficients $\alpha_k$ of the pulses in the time-domain channel response $h_t(t)$. Additionally or alternatively, the one or more constraints may be a constraint on the pulse times $\tau_k$ in the time-domain channel response $h_t(t)$.

In some implementations, the one or more constraints are model-based constraints that are known by the motion sensing system a priori and may depend, at least in part, on the standard path loss propagation model that most accurately models the propagation environment in which the motion sensing system operates. For example, the one or more constraints may depend, at least in part, on propagation loss in the space, the type of wireless communication devices operating in the propagation environment, a model of the propagation environment (e.g., indoor, outdoor, urban area, rural area, etc.), and potentially other factors. Example standard path loss propagation models that may affect the one or more constraints used include the free space path loss model, the Okumura model, the Hata path loss model, the Hata-Okumura path loss model, the Hata-Okumura Extended path loss model, the COST 231 Extended Hata path loss model, the Walfisch-Ikegami model, the Stanford University Interim (SUI) path loss model, or other types of path loss models.

Figure 8C:
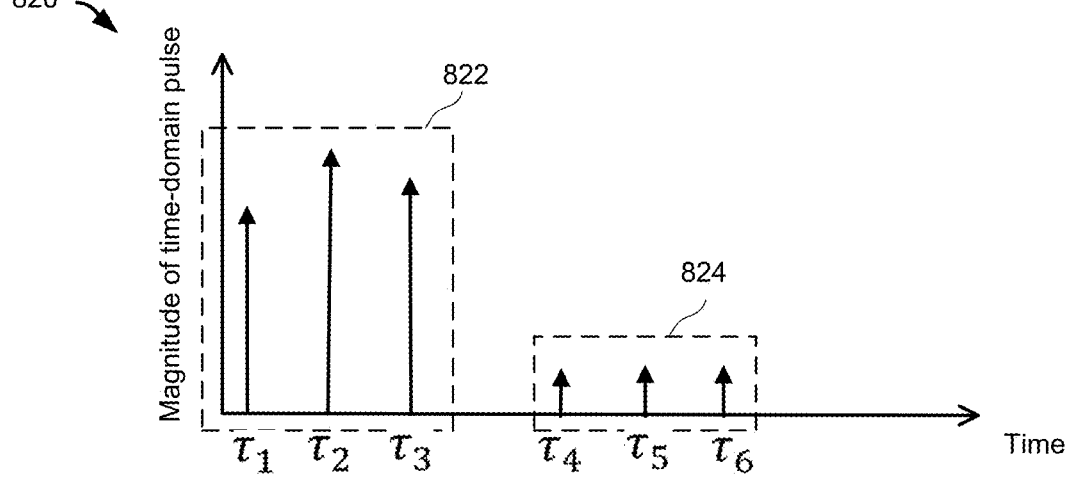
FIG. 8C is a plot showing example time-domain pulses that correlate with the frequency-domain channel response E(f) in FIG. 8A after applying an example time-domain filter representation of a propagation environment.

FIG. 8C is a plot 820 showing an example filtered time-domain channel response $\hat{h}_t(t)$ based on a constraint. In some implementations, the constraint can be indicative of a maximum delay with which a pulse can reach the first wireless communication device 702A, which in turn may be determined by the maximum attenuation a pulse can experience and still be captured within the dynamic range of the radio of the first wireless communication device 702A. Additionally or alternatively, the constraint may be indicative of the range of delays expected in the propagation environment in which the wireless communication system operates. The constraint on the amplitudes can be a function of time and may be indicative of the expected attenuation along the various signal paths in the propagation environment.

As shown in FIG. 8C, the pulses of the time-domain channel response are grouped into two clusters, a first cluster 822 and a second cluster 824. Those pulses having longer time delays (e.g., located at right side of the time axis) are the result of reflections or scatterings from objects outside the transportation platform, while those having shorter time delays (e.g., located at left side of the time axis) are the result of reflections or scatterings from objects inside the transportation platform. That means if there is a disturbance (change in amplitude) of the pulses in the first cluster 822, it is most likely to be a motion within the surroundings, whereas the modulation of pulses in the second cluster 824 can be attributed to motion of the wireless communication device itself.

In some instances, the design of a filter, which determines a threshold value (on the delay axis) to take for grouping the pulses can be specific to the environment, e.g., a car, a train box, or another type of transportation platform. Such a filter can come with certain pre-determined configurations, e.g., by a designer or by the user. In some instances, a filter can be automatically determined. In this case, as the pulses in the time-domain channel response experience modulation due to different factors, it is possible to have an adaptive algorithm that automatically determines the cutoff for grouping pulses into clusters in order to distinguish wireless signals that experience different reflections, e.g., indoor or outdoor reflections.

For example, disturbance on pulses from the second cluster 824 caused by external reflections can be more persistently present in time than disturbance on pulses from the second group 822 caused by infrequent motions. This can be measured by the time series of the time-domain channel response. In some instances, a machine learning algorithm can be implemented to read data, determine the threshold value, and to distinguish pulses by the threshold value. For example, in a given observation span of time-domain channel responses, a machine learning algorithm can measure the amount of time for which the modulating signal (disturbance on the pulse) was present. The disturbance-present-time can be used as a feature for each pulse. Then, all the pulses can be grouped into clusters, based on this feature. The algorithm can maximize the distance between the two clusters. Once the pulses have been grouped into two clusters, based on their disturbance-active-time, the threshold for external versus internal pulses can be chosen (for example) as a midpoint between the two cluster centers.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a data processing apparatus on data stored on one or more computer-readable storage devices or received from other sources. The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

In a general aspect, a mobile wireless communication device is operated for wireless motion sensing.

In a first example, a motion sensing method includes receiving wireless signals transmitted from a second wireless communication device through a space during a time period at a first wireless communication device; by operation of the first wireless communication device, generating channel state information based on the wireless signals, and detecting the first wireless communication device moved relative to the second wireless communication device during the time period. In response to detecting that the first wireless communication device moved relative to the second wireless communication device during the time period, the motion sensing method further includes updating motion sensing parameters of a motion sensing system; and processing the channel state information according to the updated motion sensing parameters to detect motion of an object, other than the first wireless communication device, in the space during the time period.

Implementations of the first example may include one or more of the following features. The first wireless communication device includes a motion sensor device, and detecting that the first wireless communication device moved during the time period comprises processing output data generated by the motion sensor device during the time period. The motion sensor device includes at least one of a gyroscope, an accelerometer, or a satellite navigation device.

Implementations of the first example may include one or more of the following features. When the motion sensing parameters of the motion sensing system is updated, a sampling rate of the motion sensing system is reduced; and when the channel state information is processed according to the updated motion sensing parameters, at least a subset of the channel state information is processed at the reduced sampling rate. When the motion sensing parameters of the motion sensing system is updated, a sampling duration of the motion sensing system is reduced; and when the channel state information is processed according to the updated motion sensing parameters, at least a subset of the channel state information is processed at the reduced sampling duration. When the motion sensing parameters of the motion sensing system are updated, a weighting factor of the motion sensing system is reduced; and when the channel state information is processed according to the updated motion sensing parameters, the reduced weighting factor is applied to at least a subset of the channel state information. At least a subset of the channel state information is discarded in response to detecting that the first wireless communication device moved during the time period.

Implementations of the first example may include one or more of the following features. The channel state information includes a set of frequency-domain channel responses. Detecting the first wireless communication device moved during the time period includes for each frequency-domain channel response, generating a time-domain channel response based on the corresponding frequency-domain channel response; and generating a filtered time-domain channel response based on a constraint applied to the time-domain channel response. The first wireless communication device is a mobile access point of a wireless communication network, and the wireless signals are transmitted by the second wireless communication device according to a wireless communication protocol of the wireless communication network.

In a second example, a mobile device includes one or more processors; and memory storing instructs that are operable when executed by the one or more processors to perform one or more operations of the first example. In a third example, a non-transitory computer readable medium comprises instructions that, when executed by data processing apparatus, perform one or more operations of the first example.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the description above.

What is claimed is:

1. A motion sensing method comprising:
   at a first wireless communication device, receiving wireless signals transmitted from a second wireless communication device through a space during a time period;
   by operation of the first wireless communication device:
      generating channel state information based on the wireless signals;
      detecting that the first wireless communication device moved relative to the second wireless communication device during the time period;
      in response to detecting that the first wireless communication device moved relative to the second wireless communication device during the time period, updating motion sensing parameters of a motion sensing system; and
      processing the channel state information according to the updated motion sensing parameters to detect motion of an object, other than the first wireless communication device, in the space during the time period.

2. The method of claim 1, wherein the first wireless communication device comprises a motion sensor device, and detecting that the first wireless communication device moved during the time period comprises processing output data generated by the motion sensor device during the time period.

3. The method of claim 2, wherein the motion sensor device comprises at least one of a gyroscope, an accelerometer, or a satellite navigation device.

4. The method of claim 1, wherein updating the motion sensing parameters of the motion sensing system comprises reducing a sampling rate of the motion sensing system, and processing the channel state information according to the updated motion sensing parameters comprises processing at least a subset of the channel state information at the reduced sampling rate.

5. The method of claim 1, wherein updating the motion sensing parameters of the motion sensing system comprises reducing a sampling duration of the motion sensing system, and processing the channel state information according to the updated motion sensing parameters comprises processing at least a subset of the channel state information at the reduced sampling duration.

6. The method of claim 1, wherein updating the motion sensing parameters of the motion sensing system comprises reducing a weighting factor of the motion sensing system, and processing the channel state information according to the updated motion sensing parameters comprises applying the reduced weighting factor to at least a subset of the channel state information.

7. The method of claim 1, comprising discarding at least a subset of the channel state information in response to detecting that the first wireless communication device moved during the time period.

8. The method of claim 1, wherein the channel state information comprises a set of frequency-domain channel responses, and detecting that the first wireless communication device moved during the time period, comprises:
   for each frequency-domain channel response,
      generating a time-domain channel response based on the corresponding frequency-domain channel response; and
      generating a filtered time-domain channel response based on a constraint applied to the time-domain channel response.

9. The method of claim 1, wherein the first wireless communication device is a mobile access point of a wireless communication network, and the wireless signals are transmitted by the second wireless communication device according to a wireless communication protocol of the wireless communication network.

10. A mobile device comprising:
    one or more processors; and
    memory storing instructions that are operable when executed by the one or more processors to perform operations comprising:
       receiving wireless signals transmitted from a wireless communication device through a space during a time period;
       generating channel state information based on the wireless signals;
       detecting that the mobile device moved relative to the wireless communication device during the time period;
       in response to detecting that the mobile device moved relative to the second wireless communication device during the time period, updating motion sensing parameters of a motion sensing system; and
       processing the channel state information according to the updated motion sensing parameters to detect motion of an object, other than the mobile device, in the space during the time period.

11. The mobile device of claim 10, wherein the mobile device comprises a motion sensor device, and detecting that the mobile device moved during the time period comprises processing output data generated by the motion sensor device during the time period.

12. The mobile device of claim 11, wherein the motion sensor device comprises at least one of a gyroscope, an accelerometer, or a satellite navigation device.

13. The mobile device of claim 10, wherein updating the motion sensing parameters of the motion sensing system comprises reducing a sampling rate of the motion sensing system, and processing the channel state information according to the updated motion sensing parameters comprises processing at least a subset of the channel state information at the reduced sampling rate.

14. The mobile device of claim 10, wherein updating the motion sensing parameters of the motion sensing system comprises reducing a sampling duration of the motion sensing system, and processing the channel state information according to the updated motion sensing parameters comprises processing at least a subset of the channel state information at the reduced sampling duration.

15. The mobile device of claim 10, wherein updating the motion sensing parameters of the motion sensing system comprises reducing a weighting factor of the motion sensing system, and processing the channel state information according to the updated motion sensing parameters comprises applying the reduced weighting factor to at least a subset of the channel state information.

16. The mobile device of claim 10, the operations comprising discarding at least a subset of the channel state information in response to detecting that the mobile device moved during the time period.

17. The mobile device of claim 10, wherein the channel state information comprises a set of frequency-domain channel responses, and detecting that the mobile device moved during the time period comprises:
for each frequency-domain channel response,
generating a time-domain channel response based on the corresponding frequency-domain channel response; and
generating a filtered time-domain channel response based on a constraint applied to the time-domain channel response.

18. The mobile device of claim 10, wherein the mobile device is a mobile access point of a wireless communication network, and the wireless signals are transmitted by the second wireless communication device according to a wireless communication protocol of the wireless communication network.

19. A non-transitory computer readable medium comprising instructions that are operable when executed by data processing apparatus to perform operations comprising:
obtaining wireless signals transmitted to a first wireless communication device from a second wireless communication device through a space during a time period;
generating channel state information based on the wireless signals;
detecting that the first wireless communication device moved relative to the second wireless communication device during the time period;
in response to detecting that the first wireless communication device moved relative to the second wireless communication device during the time period, updating motion sensing parameters of a motion sensing system; and
processing the channel state information according to the updated motion sensing parameters to detect motion of an object, other than the first wireless communication device, in the space during the time period.

20. The computer readable medium of claim 19, wherein the channel state information comprises a set of frequency-domain channel responses, and detecting that the first wireless communication device moved during the time period comprises:
for each frequency-domain channel response,
generating a time-domain channel response based on the corresponding frequency-domain channel response; and
generating a filtered time-domain channel response based on a constraint applied to the time-domain channel response.

* * * * *